United States Patent
Walch et al.

(10) Patent No.: US 10,445,555 B2
(45) Date of Patent: Oct. 15, 2019

(54) SYSTEMS AND METHODS FOR RIDGE-BASED FINGERPRINT ANALYSIS

(75) Inventors: Mark A. Walch, Chantilly, VA (US); Donald T. Gantz, Fairfax, VA (US); Daniel Thomas Gantz, Arlington, VA (US)

(73) Assignee: SCIOMETRICS, LLC, Chantilly, VA (US)

(*) Notice: Subject to any disclaimer, the term of this patent is extended or adjusted under 35 U.S.C. 154(b) by 63 days.

(21) Appl. No.: 13/367,153

(22) Filed: Feb. 6, 2012

(65) Prior Publication Data

US 2013/0101186 A1 Apr. 25, 2013

Related U.S. Application Data

(63) Continuation-in-part of application No. 12/611,893, filed on Nov. 3, 2009.

(60) Provisional application No. 61/439,802, filed on Feb. 4, 2011, provisional application No. 61/147,720, filed on Jan. 27, 2009.

(51) Int. Cl.
*G06K 9/00* (2006.01)
(52) U.S. Cl.
CPC ......... *G06K 9/00093* (2013.01); *G06K 9/001* (2013.01); *G06K 9/0008* (2013.01); *G06K 2209/01* (2013.01)
(58) Field of Classification Search
None
See application file for complete search history.

(56) References Cited

U.S. PATENT DOCUMENTS

| | | | | |
|---|---|---|---|---|
| 2001/0016055 A1* | 8/2001 | Harkless | ............. | G06K 9/0008 382/115 |
| 2002/0126883 A1* | 9/2002 | Senior | ............... | G06K 9/00067 382/125 |
| 2002/0168093 A1* | 11/2002 | Sanders | ............ | G06K 9/00087 382/125 |
| 2003/0091724 A1* | 5/2003 | Mizoguchi | ......... | G06K 9/00087 427/1 |
| 2004/0101173 A1* | 5/2004 | Hara | .................. | G06K 9/00087 382/124 |
| 2008/0101663 A1* | 5/2008 | Lo | ........................ | G06K 9/0008 382/124 |
| 2008/0192988 A1* | 8/2008 | Uludag | ............. | G06K 9/00046 382/115 |

OTHER PUBLICATIONS

Isenor, D. K., and Safwat G. Zaky. "Fingerprint identification using graph matching." Pattern Recognition 19.2 (1986): 113-122. 10 pages (Year: 1986).*

(Continued)

*Primary Examiner* — Ryan P Potts
(74) *Attorney, Agent, or Firm* — Procopio, Cory, Hargreaves & Savitch LLP

(57) ABSTRACT

In an automated method of processing fingerprint images, identity information is extracted from prints typically classified as having "no identification value" because of sparse or missing minutiae by capturing ridge information. Bezier approximations of ridge curvature are used as Ridge Specific Markers. Control points arising from Bezier curves generate unique polygons that represent the actual curve in the fingerprint. These polygons are generated for latent prints and reference prints and compared to determine whether a match exists.

9 Claims, 16 Drawing Sheets

(56) References Cited

OTHER PUBLICATIONS

Rowe, Robert K., et al. "A multispectral whole-hand biometric authentication system." Biometrics Symposium, 2007. IEEE, 2007. 6 pages (Year: 2007).*

Larkin, Kieran G., and Peter A. Fletcher. "A coherent framework for fingerprint analysis: are fingerprints holograms?." Optics Express 15.14 (2007): 8667-8677. 11 pages (Year: 2007).*

Huaqiang, Yuan, et al. "A fingerprint feature extraction algorithm based on curvature of Bezier curve." Progress in Natural Science 17.11 (2007): 1376-1381.6 pages (Year: 2007).*

\* cited by examiner a. 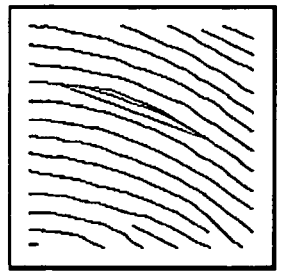 b. 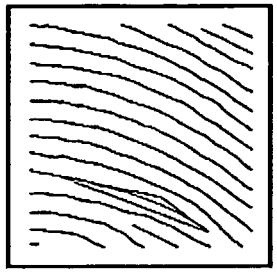 c. 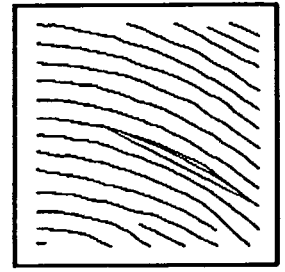
d. 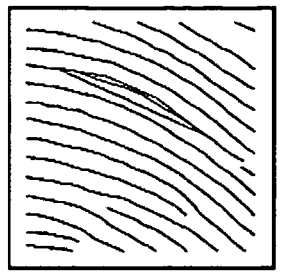 e. 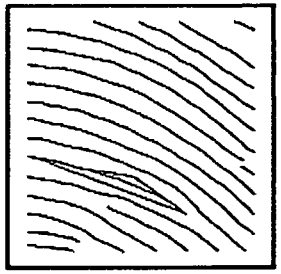 f. 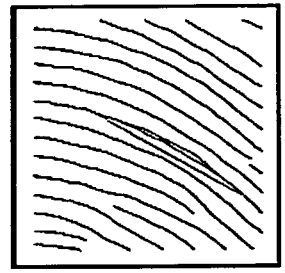
Fig. 6

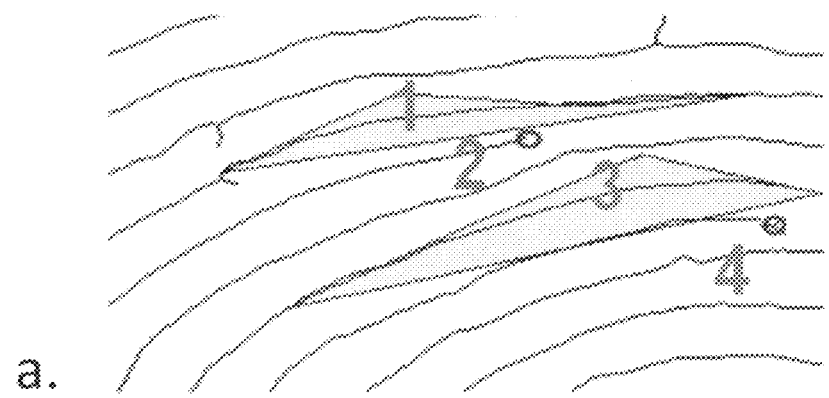
Fig. 7
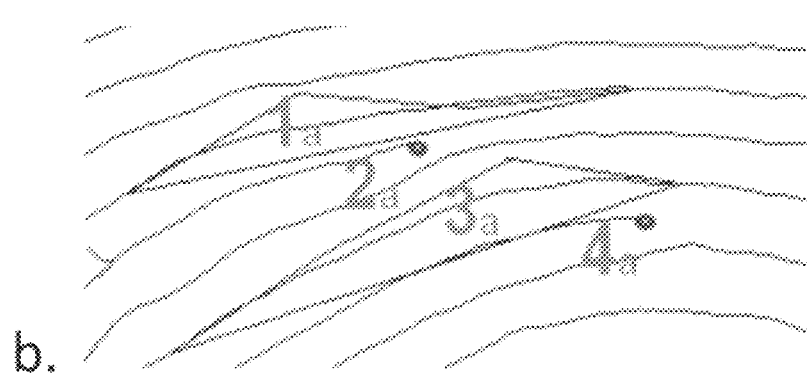
 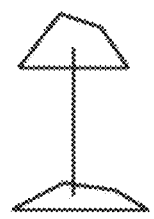 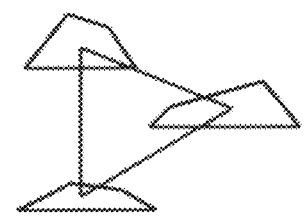
a.    b.    c.
Fig. 8

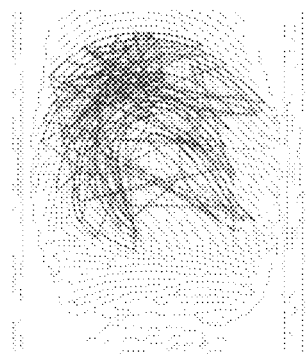
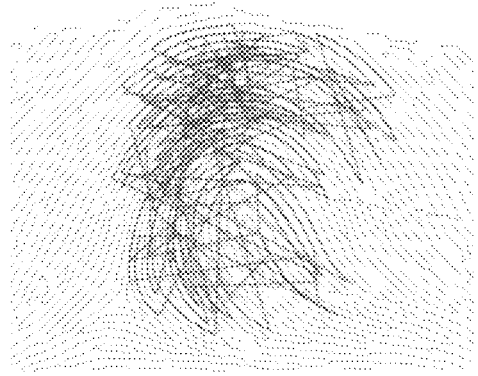
a. Fig. 9 b.
a. b.
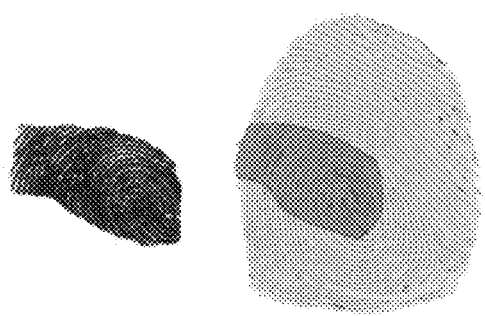
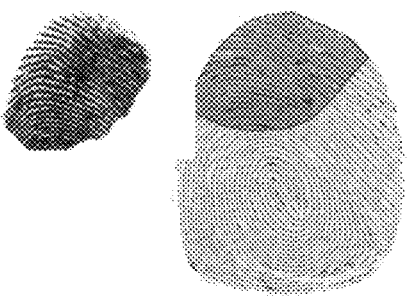
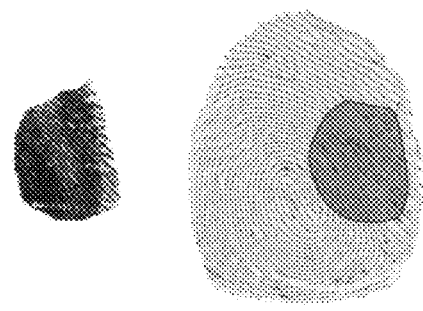
c. d.
Fig. 10

Fig. 14  a.   b. 
Fig. 15  a. 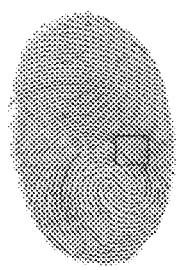  b. 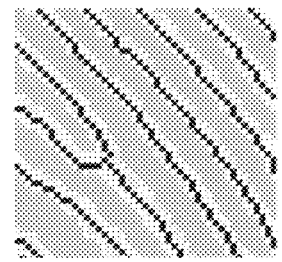
Fig. 16  a. 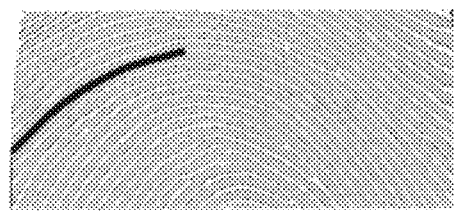
b. 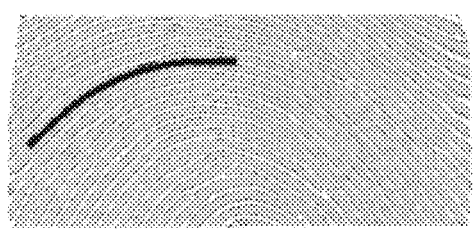
c. 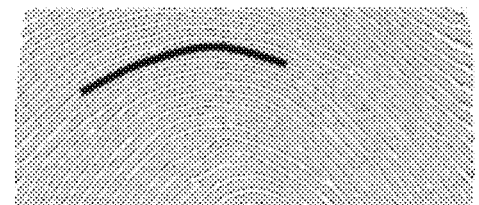

a.

b.

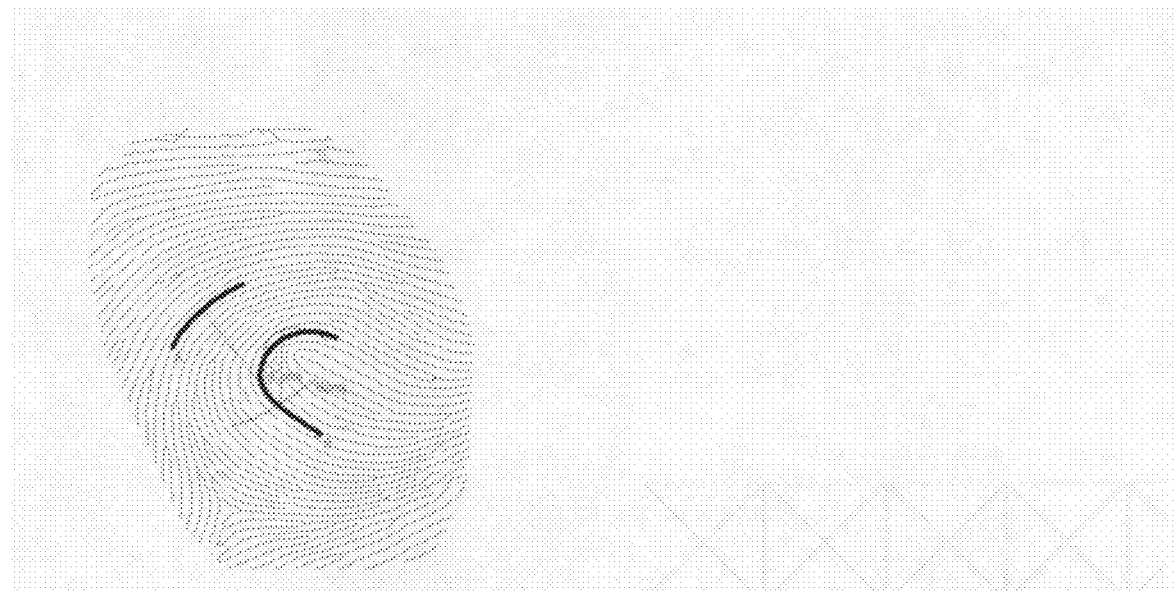
Fig. 25
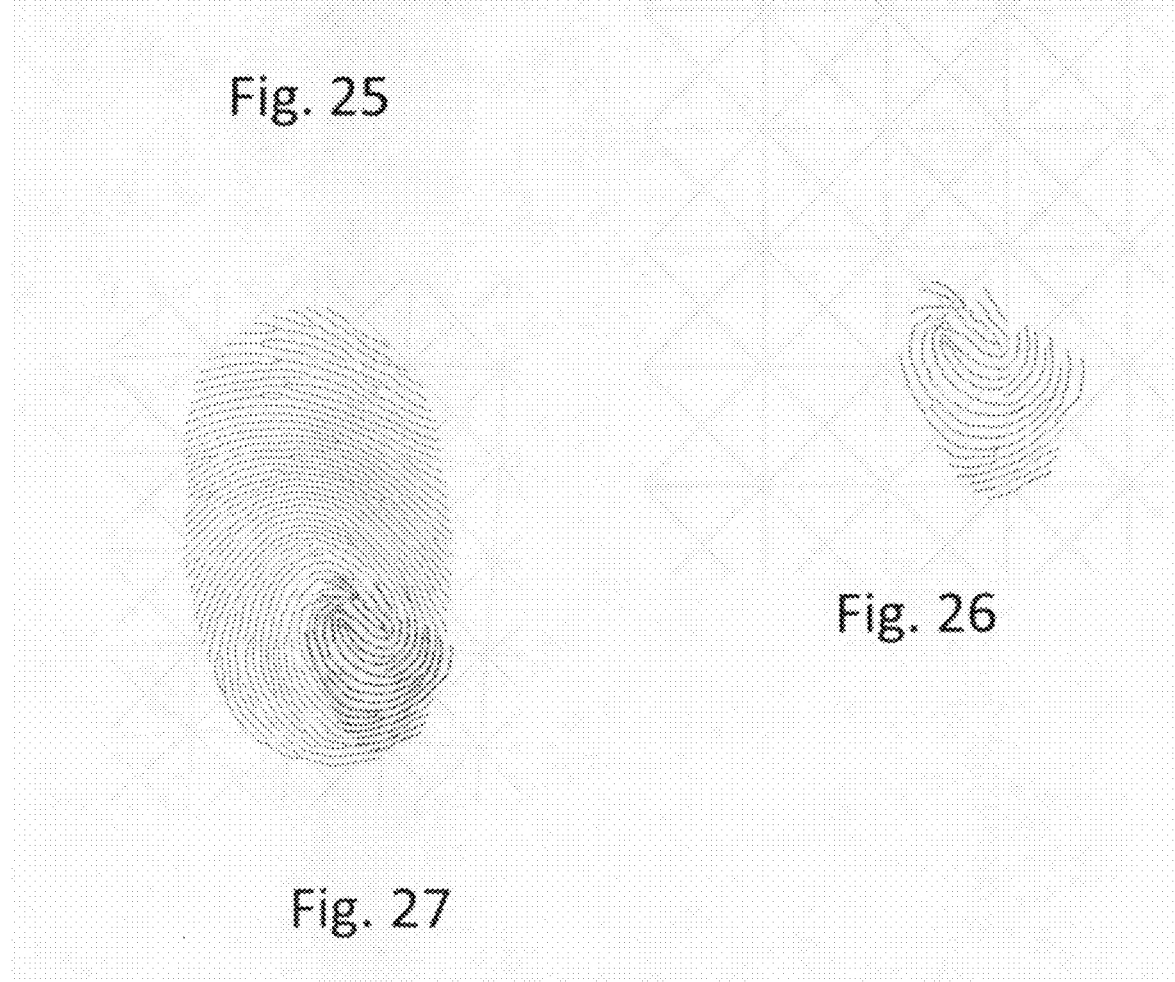
Fig. 26
Fig. 27

SYSTEMS AND METHODS FOR RIDGE-BASED FINGERPRINT ANALYSIS

This application claims the benefit of U.S. Provisional Patent Application Ser. No. 61/439,802 filed Feb. 4, 2011 titled "Multimodal Fused Biometrics On Portable Devices For Virtual And Physical Access." This application also claims priority of co-pending U.S. patent application Ser. No. 12/611,893, publication number US 2010/0189316 A1, filed Nov. 3, 2009. The entire disclosure of each of these prior applications is incorporated herein by reference.

Elements of this invention were made with U.S. government support under contract J-FBI-09-325 awarded by the Federal Bureau of Investigation. The U.S. government has certain rights in the invention.

TECHNICAL FIELD

The present invention is directed generally to the field of identifying persons using fingerprints and/or other biometrics.

BACKGROUND ART

As the breadth of biometric identification implementations grow across a variety of sectors, fingerprints continue to be a critical source for establishing identity. Latent prints are prints that remain after an individual has left the scene where the prints are found. Tenprint is a term of art describing a complete set of prints that are intentionally captured using ink on fingerprint cards, a live scanner or similar methods where the individual is present as the prints are obtained. The term tenprint is used herein to refer generally to a reference prints or prints, whether or not it comprises a complete print or set of prints, and the term latent print is used to refer generally to a print that is to be compared to a reference print or prints.

Many latent fingerprints do not provide a practical basis for identification using conventional approaches. Matching latent prints with corresponding exemplars requires highly skilled human expertise. Under current practice, Latent Fingerprint Examiners determine that many prints have no identification value due to the limited quantity and quality of their friction ridge information. This class of prints with insufficient "minutiae" to support identification is referenced as NIV (No identification value) latent prints. Conventional fingerprint searching requires that a latent print contain a sufficient number of minutiae (ridge bifurcations and terminations) to support searching. Without enough minutiae, searching cannot be performed.

Thus, the inventors have determined that there is a need for an automated method that can work with information presented within latent prints beyond traditional minutiae.

DISCLOSURE OF INVENTION

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description.

In an embodiment, fingerprint images are processed to identify friction ridges, and the contours of these ridges are encoded, for example, by fitting Bezier curves to the ridges and storing data defining the curves.

The ridge data is then used in automated extraction of information from latent prints, performing a function similar to the function of traditionally defined minutiae in conducting an identification process.

When applied to latent prints, the disclosed embodiments enable useful processing of multiple latent fingerprint samples from a single or multiple sources by extracting available information from the poor quality images. When applied to tenprints, the methods disclosed make it possible to gain information from prints that are currently not useable due to poor inking or other process failures when taking the print.

BRIEF DESCRIPTION OF DRAWINGS

The accompanying drawings, which are incorporated herein and form a part of the specification, illustrate various exemplary embodiments of the present invention and, together with the description, further serve to explain various principles and to enable a person skilled in the pertinent art to make and use the invention.

FIGS. 6a through 6c show Bezier polygons identified in ridge zones for a first example finger, and FIGS. 6d through 6f show Bezier polygons in ridge zones for a second example finger;

FIGS. 7a and 7b illustrate a comparison of multiple Bezier-based features across prints;

FIG. 8a through 8c are examples of graphs constructed from Ridge Specific Markers according to an example embodiment;

FIG. 9a illustrates a latent print and FIG. 9b is a full reference print corresponding to the latent print of FIG. 9a;

FIG. 10 shows an example of four latent fragments identified as matching a tenprint, according to an example embodiment;

FIG. 14 is an example of a high-contrast representation of the fingerprint of FIG. 13

FIG. 15a is a fingerprint image and FIG. 15b is example of skeleton output corresponding to a portion of FIG. 15a;

FIG. 16 illustrates an example of curve selection from a single ridge incorporating staggered starting points and overlap;

FIG. 25 illustrates a poorly-matched 3-tuple;

FIG. 26 is an illustration of a triangle-tessellated grid used for analysis in the example embodiment; and FIG. 27 illustrates a latent print overlaid onto a reference print.

BEST MODE FOR CARRYING OUT THE INVENTION

Figure 1A:
FIG. 1 is an example image of Latent Print Remnants and Tenprint portions.

The present invention will be described in terms of one or more examples, with reference to the accompanying drawings. In the drawings, some like reference numbers indicate identical or functionally similar elements. Additionally, the left-most digit(s) of most reference numbers may identify the drawing in which the reference numbers first appear.

The present invention will be explained in terms of exemplary embodiments. This specification discloses one or more embodiments that incorporate the features of this invention. The disclosure herein will provide examples of embodiments, including examples of data analysis from which those skilled in the art will appreciate various novel approaches and features developed by the inventors. These various novel approaches and features, as they may appear herein, may be used individually, or in combination with each other as desired.

In particular, the embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, persons skilled in the art may implement such feature, structure, or characteristic in connection with other embodiments, whether or not explicitly described.

Embodiments of the invention may be implemented in hardware, firmware, software, or any combination thereof, or may be implemented without automated computing equipment. Embodiments of the invention may also be implemented as instructions stored on a machine-readable medium, which may be read and executed by one or more processors. A machine-readable medium may include any mechanism for storing or transmitting information in a form readable by a machine (e.g. a computing device). For example, a machine-readable medium may include read only memory (ROM); random access memory (RAM); hardware memory in handheld computers, PDAs, mobile telephones, and other portable devices; magnetic disk storage media; optical storage media; thumb drives and other flash memory devices; electrical, optical, acoustical, or other forms of propagated signals (e.g. carrier waves, infrared signals, digital signals, analog signals, etc.), and others. Further, firmware, software, routines, instructions, may be described herein as performing certain actions. However, it should be appreciated that such descriptions are merely for convenience and that such actions in fact result from computing devices, processors, controllers or other devices executing the firmware, software, routines, instructions, etc.

In the biometric field, the term "identification" is sometimes used to mean a process where an individual identity is determined by a one-to-many database search. The term "verification" is sometimes used to refer to a process of one-to-one matching. In this specification, each of the terms "identification" and "verification" are intended to encompass both possibilities. For example, when the term "identification" is used, it should be understood that this term may refer to identification and/or verification, and when the term "verification" is used, it should be understood that identification may be included within the scope of verification.

Advantages of certain embodiments of the novel methods and processes described herein include, among other things, the ability to extract identity information from prints typically classified as having "no identification value" because of sparse or missing minutiae by capturing ridge information, the ability to fuse several individual latent print remnants into a single descriptor of identity, and the ability to render poor quality tenprints useable for reference purposes.

Figure 1B:

FIG. 1a shows examples of latent fingerprint remnants from the same thumb. FIG. 1b is a complete fingerprint image of the subject thumb. Using conventional minutiae-based methods, it is impossible to match the latent print remnants of FIG. 1a against the image stored from a tenprint in FIG. 1b. However, the inventor has discovered that these latent prints become valuable sources of identity when a ridge-centric identification method is applied.

Figure 2:
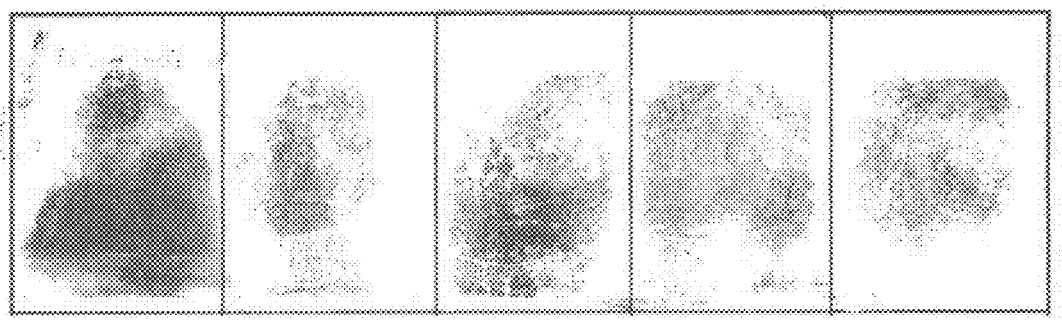
FIG. 2 is an example image of a tenprint for multiple fingers where the images are not useable because of poor ink quality.

FIG. 2 is an example image of a portion of a tenprint where the images of multiple fingers are not useable because of poor ink quality.

Figure 3A:
FIG. 3a is an example fingerprint from a tenprint with over-inked zones.
Figure 3B:
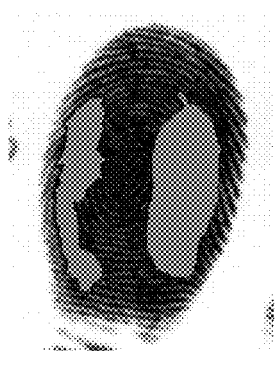
FIG. 3b shows the image of FIG. 3a where portions of the print that do not contribute identification information have been masked.

FIG. 3a shows a fingerprint from a tenprint with over-inked zones that have no useful information. The remainder of the print, however, can provide a basis for identification in the context of the current invention. The image in FIG. 3b shows masking applied to the portions of the print that are over-inked and thus invalid for identification purposes.

Even the poorest latent prints that do not show conventional minutiae may present several good representations of friction ridges. These ridges offer an opportunity for automated extraction of information from such latent prints. The term "Ridge Specific Markers" will be used to specify a ridge-associated feature that can be associated with a specific section of a ridge based on the geometric information available from the ridge. The inventors have determined that the concept of Ridge Specific Markers offers a potential innovation by using ridge geometry to create a new feature to supplement the missing bifurcations and ridge endings. Stable Ridge Specific Markers perform a function similar to the function of traditionally defined minutiae in conducting an identification process according to certain embodiments described herein.

Figure 4:
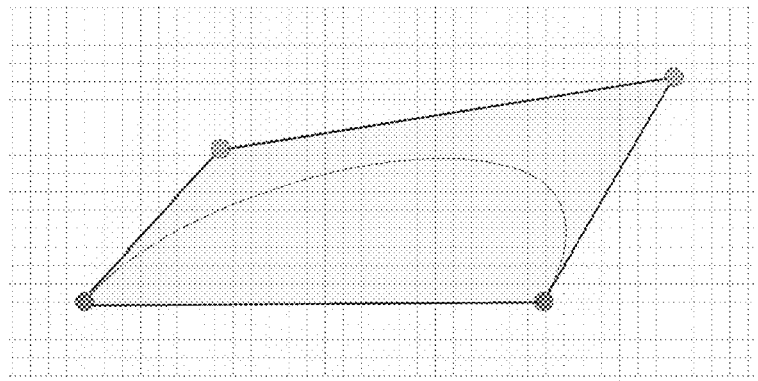
FIG. 4 is an example of a simple Bezier curve and polygon defined by control and end points.

Bezier curves are a method of representing geometric paths, named after Pierre Bezier, a French mathematician and engineer who developed this method of drawing in the late 1960s while working for the automobile manufacturer Renault. Bezier curves are the cornerstone of Computer Aided Design methods used for architectural and engineering design as well for scalable fonts used in desktop publishing. The most basic Bezier curve consists of two end points and two control points. FIG. 4 shows a simple Bezier curve and its four related points. Manipulating these defining points can alter the curve. Bezier values offer a way of describing curves that is both compact and accurate. The four "Bezier points" (two end points and two control points") replace the entire set of Cartesian plot points that would otherwise be necessary for curve representation.

In an embodiment, Bezier-based curve descriptors are used to specify Ridge Specific Markers as follows. A Bezier curve is a smooth, mathematically defined curve and can thus approximate the path of a curved object such as a fingerprint ridge. An advantage of a Bezier curve in the context of the present process is that its mathematical form can be expressed by defining a small number of control points. Bezier relationships can be effective in identifying similar curves because the relationship among the points is derived from the curve. Because they can be precisely fitted into the curvature of ridges, Bezier descriptors can be used to "mark" positions on the ridges creating a new form of "minutiae" where traditional minutiae are scarce or even non-existent.

Connecting the four Bezier descriptors of a curve defines a polygon. The relationships among the corner points within this polygon can be expressed as data elements that can be compared directly. FIG. 4 also shows the Bezier-based polygon (quadrilateral) associated with the Bezier curve.

The angles and distances define a unique representation of the polygon. This, the polygon becomes a unique marker for a particular curve segment. As will be seen, in disclosed embodiments the Bezier curves are applied to provide a means of imputing "minutiae" where traditional minutiae do not exist.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the invention. In addition, the grouping of functions within a module, block or step is for ease of description. Specific functions or steps can be moved from one module or block without departing from the invention.

The various illustrative logical blocks and modules described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of machine or computer readable storage medium. An exemplary storage medium can be coupled to the processor such that the processor can read information from, and write information to, the storage medium. In the alternative, the storage medium can be integral to the processor. The processor and the storage medium can reside in an ASIC.

Figure 5:
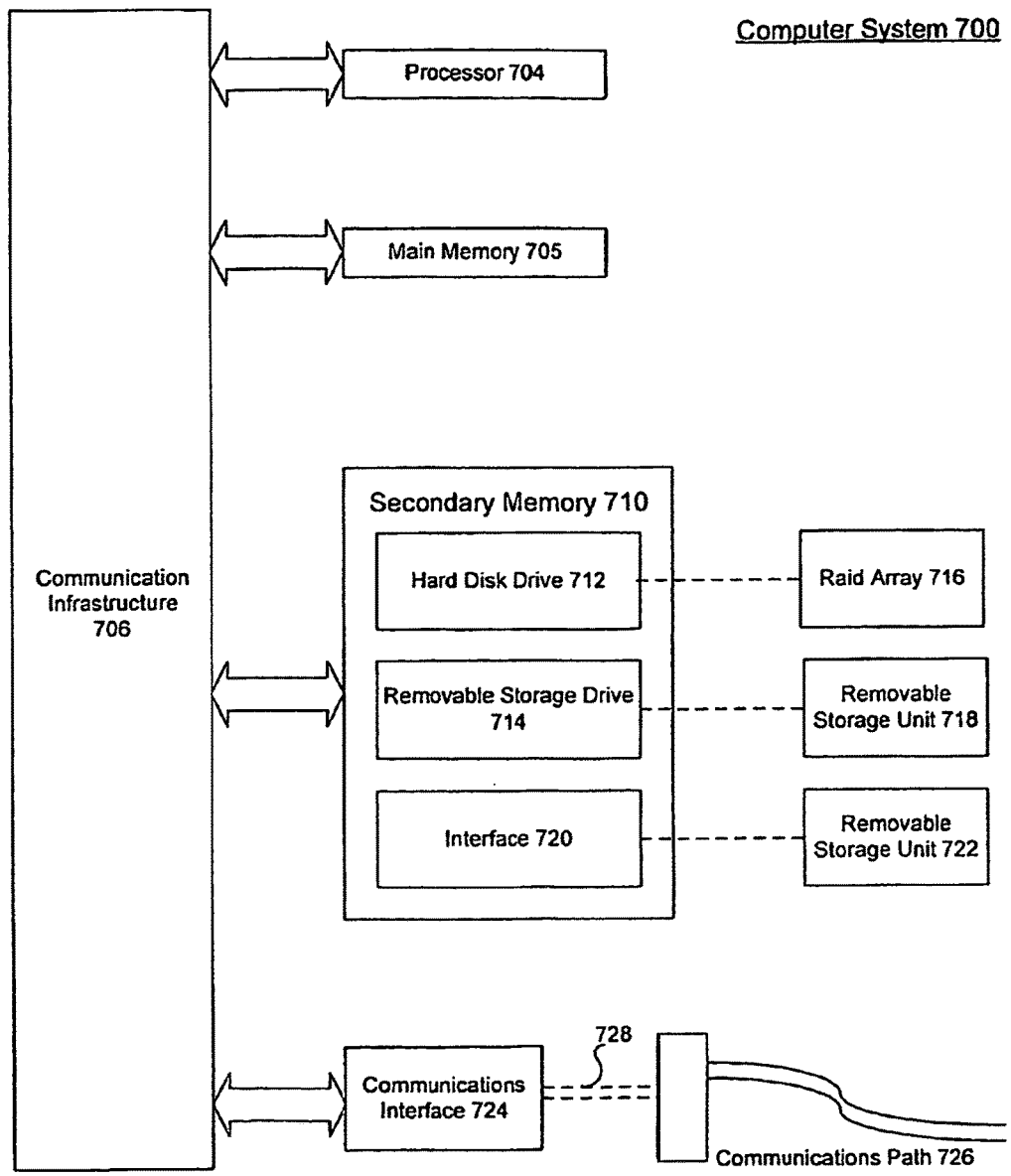
FIG. 5 is a block schematic diagram of an exemplary computer hardware system used in some example embodiments to implement the processes disclosed herein.

FIG. 5 is a block schematic diagram of an example embodiment of a computing system on which the disclosed analysis can be performed. The example embodiment shows a general-purpose computer system 700, such as a PC system. In particular, the methods disclosed herein can be performed manually, implemented in hardware, or implemented as a combination of software and hardware. Consequently, desired features of the invention may be implemented in the environment of a computer system or other processing system. The computer system 700 includes one or more processors, such as processor 704. Processor 704 can be a special purpose or a general-purpose digital signal processor. The processor 704 is connected to a communication infrastructure 706 (for example, a bus or network). Various software implementations are described in terms of this exemplary computer system. After reading this description, it will become apparent to a person skilled in the relevant art how to implement the invention using other computer systems and/or computer architectures.

Computer system 700 also includes a main memory 705, preferably random access memory (RAM), and may also include a secondary memory 710. The secondary memory 710 may include, for example, a hard disk drive 712, and/or a RAID array 716, and/or a removable storage drive 714, representing a floppy disk drive, a magnetic tape drive, an optical disk drive, solid state memory, USB port for a thumb drive, PC card slot, SD card slot for a flash memory, etc. The removable storage drive 714 reads from and/or writes to a removable storage unit 718 in a well-known manner. Removable storage unit 718, represents a floppy disk, magnetic tape, magnetic drive, optical disk, thumb drive, flash memory device, etc. As will be appreciated, the removable storage unit 718 includes a computer usable storage medium having stored therein computer software and/or data.

In alternative implementations, secondary memory 710 may include other similar means for allowing computer programs or other instructions to be loaded into computer system 700. Such means may include, for example, a removable storage unit 722 and an interface 720. Examples of such means may include a program cartridge and cartridge interface (such as that found in video game devices), a removable memory chip (such as an EPROM, or PROM) and associated socket, and other removable storage units 722 and interfaces 720 which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet interface), a communications port, a wireless network communications device such as an IEEE 802.11x wireless Ethernet device, 3G or 4G cellular data connection, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path 726. Communications path 726 carries signals 728 and may be implemented using wire or cable, fiber optics, a phone line, a cellular phone link, an RF link and other present or future available communications channels.

The terms "computer program medium" and "computer usable medium" are used herein to generally refer to all available types of digital media, for example, removable storage drive 714, a hard disk installed in hard disk drive 712, and signals 728. These computer program products are means for providing software to computer system 700.

Computer programs (also called computer control logic) are stored in main memory 708 and/or secondary memory 710. Computer programs may also be received via communications interface 724. Such computer programs, when executed by the processor 704, enable the computer system 700 to implement the present invention as discussed herein. In particular, the computer programs, when executed, enable the processor 704 to implement the processes of the present invention. Where the invention is implemented using software, the software may be provided as a computer program product on media or transmitted digitally via one of the network connections available to computer system 700, and loaded into computer system 700, for example on raid array 716, removable storage drive 714, hard drive 712 or communications interface 724.

As shown in FIGS. 6a through 6f, Bezier polygons define unique features in places where bifurcations and terminations either do not exist or are sparse.

Multiple Bezier polygons can be combined into a single set of features useable for latent-to-reference print matching. FIG. 7a shows a latent print that has been processed to associate Bezier polygons with the features present in the print. FIG. 7b is a corresponding reference print processed to associate Bezier polygons with its features. FIGS. 7a and 7b also illustrates how Bezier features can be used either with or without traditional minutiae to expand the field of potential "minutiae" that can be used for fingerprint matching. In this example, features 4 (and 4a) represent a conventional minutiae feature, specifically a ridge termination. Features 1, 2, and 3 in FIG. 7a, corresponding to Features 1a, 2a and 3a in FIG. 7b, are Bezier-based Ridge Specific Markers. It should be noted that Bezier polygons and a selected set of reference points within the actual curve can be used interchangeably for computational purposes in the present invention.

The Ridge Specific Markers create "anchor points" from which graph-based recognition processes can be applied to fingerprints. A detailed discussion of graph-base recognition is provided in U.S. Pat. No. 7,724,956, the disclosure of which is incorporated herein by reference. The Bezier polygons serve as a building block for graphs. In an embodiment, the centroids of the polygons become the "vertices" of the graph. The "edges" for these graphs take the form both of actual ridgelines as well as connectors between the Ridge Specific Markers. In an embodiment, graphs are built from multiple combinations of Ridge Specific Markers. FIG. 8a shows an example of a graph with a single polygon, FIG. 8b shows an example with paired polygons, and FIG. 8c shows an example with triplet polygons.

An example embodiment presented herein uses a pairwise graph as a comparative structure, however, those skilled in the art will understand that any number of polygons can be selected within the scope of the invention. For example, the number of polygons used to build the graph may be any desired number determined through experimentation, and may be larger than two or three. Whereas specific comparisons can be made between specific ridges either through direct comparison or through comparison of polygon representations and these comparisons in their own right provide significant identification power, graphs can be used to describe the overall relationships among the ridges to further expand this identification power.

The power of the Ridge Specific Markers incorporating the Bezier Polygon feature is illustrated through a latent and comparator prints example. FIGS. 9a and 9b show a latent and reference print, respectively, for a right thumb. A similar comparison could also be made using points on the curve directly.

FIG. 9a shows a latent print from the same thumb that produced the full reference print shown in FIG. 9b. In an embodiment, a Ridge Specific Marker process is applied to identify common ridges between the same prints.

In an embodiment, latent print identification is performed through a multiple step process that ingests images of latent prints and produces a ranked list of identities. The ranking in this list reflects the strength of the match between the latent print and the corresponding reference. It should be noted that for purposes of this invention, "reference prints" may refer either to tenprints, partial sets of reference prints, or other latent prints.

Figure 11A:
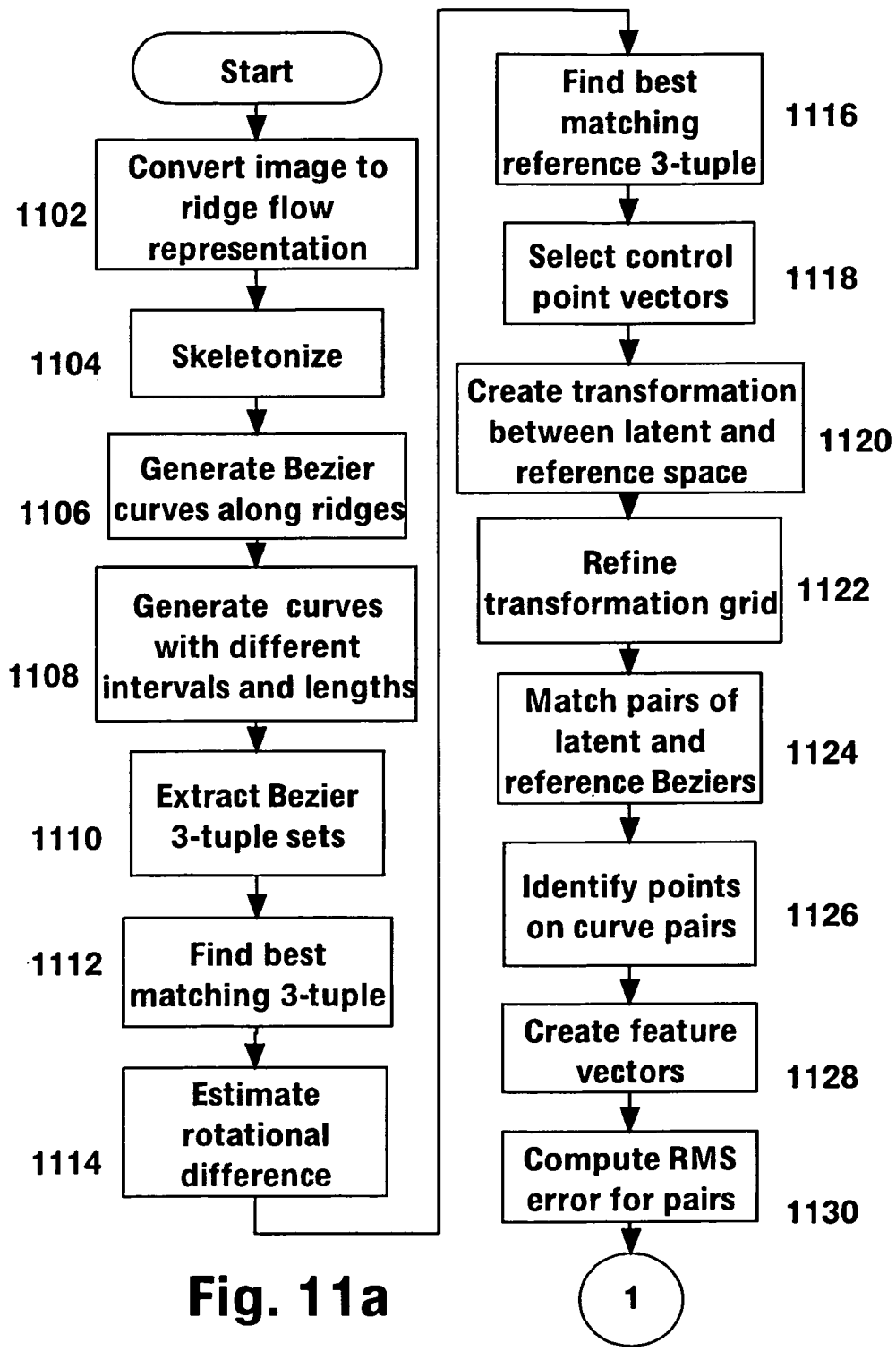
FIGS. 11a and 11b together constitute a flow chart for an example embodiment of an overall process for comparing latent fingerprint images to reference prints.
Figure 11B:
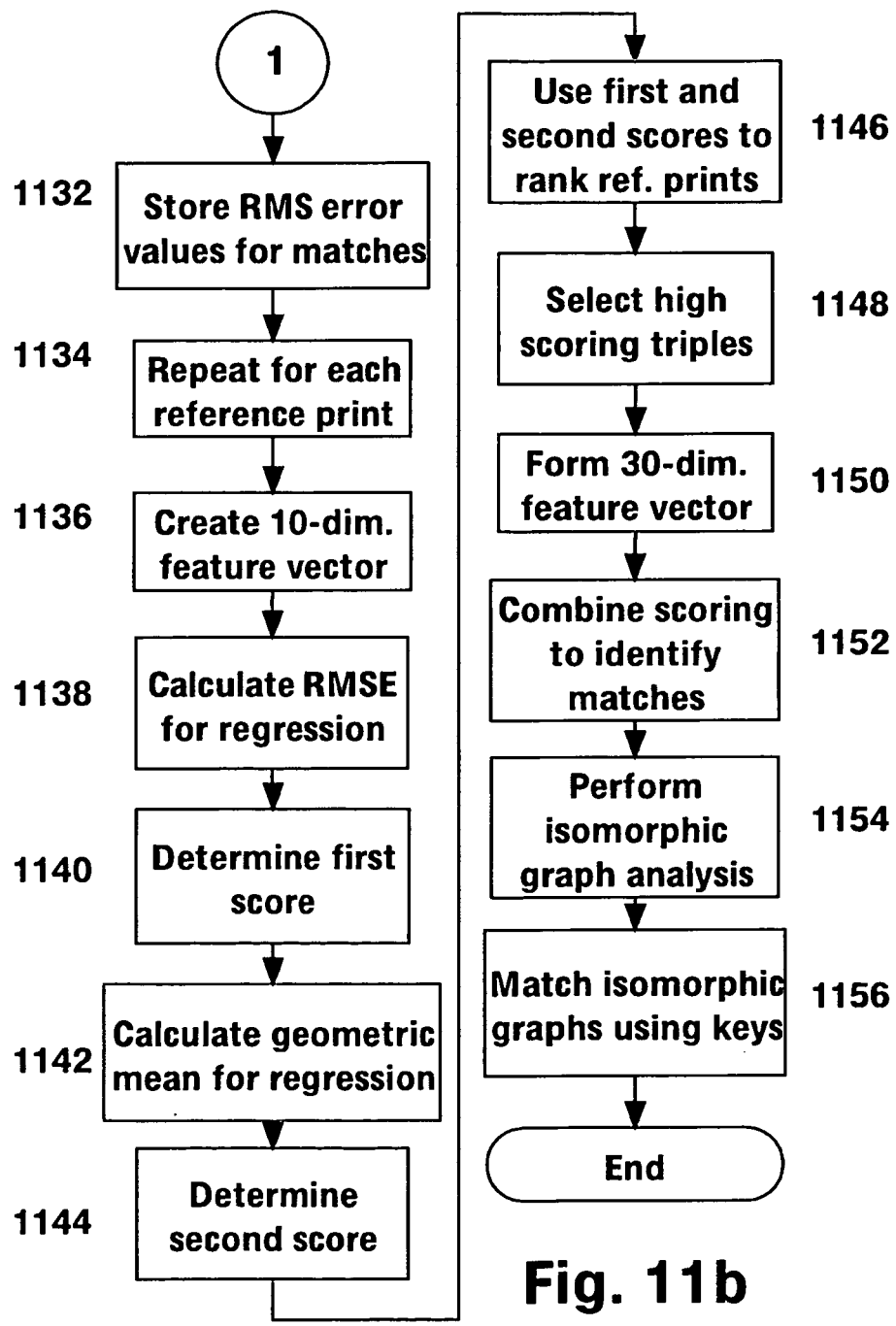

FIGS. 11a and 11b together comprise a flow chart showing one example embodiment of a method for processing individual latent prints and comparing them against a collection of references. Referring to FIG. 11a, in step 1102, the fingerprint image is converted into a high-contrast representation of ridge flow. Step 1102 is preferably performed according to the process shown in the flow chart of FIG. 12.

Figure 12:
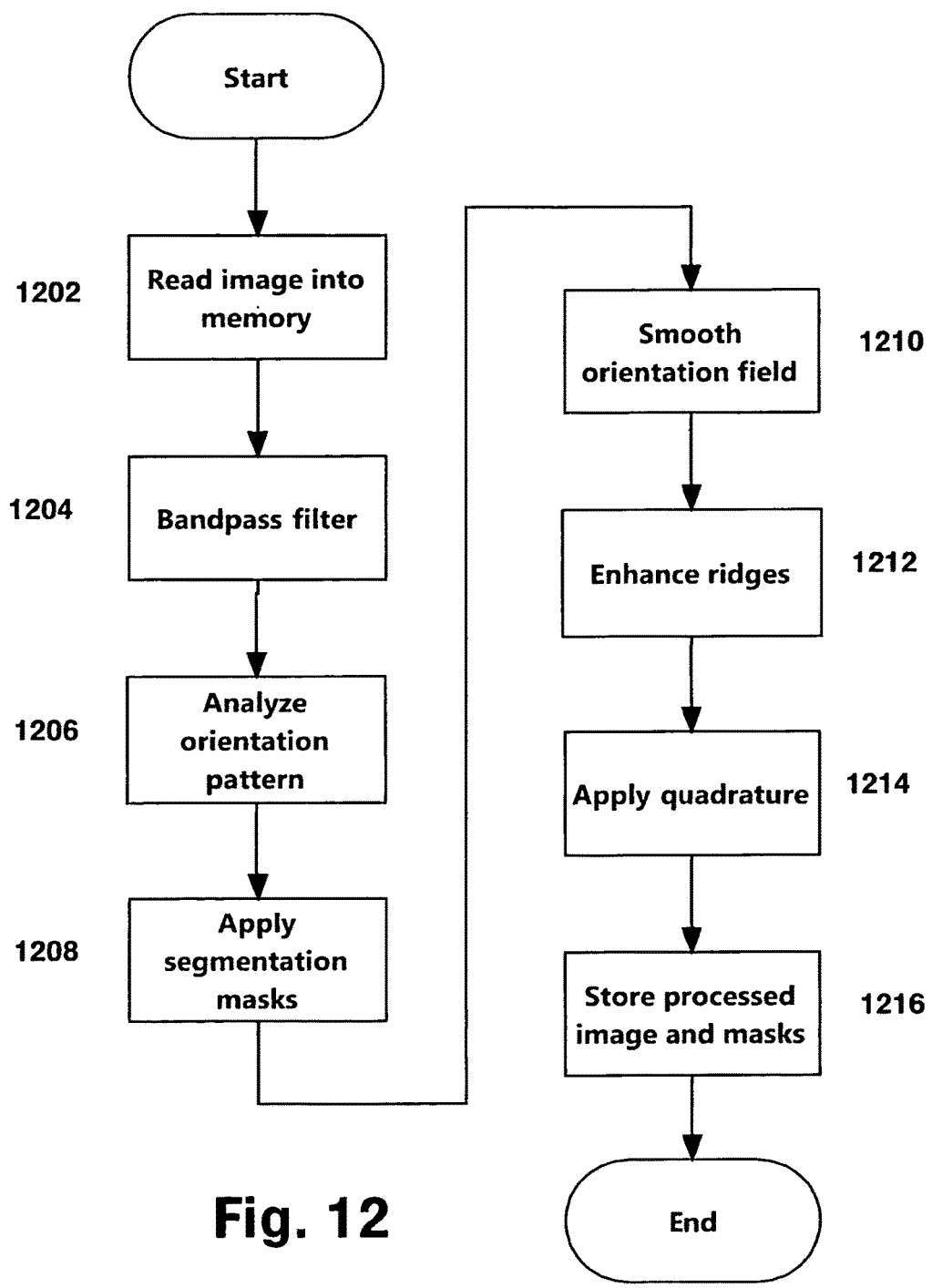
FIG. 12 is a flow chart showing an example embodiment of image processing steps used in the processes shown in FIGS. 11a and 11b.

Referring to FIG. 12, in this example embodiment the conversion is performed as follows. A fingerprint pattern may be idealized as a wavelike pattern of periodic ridges. That is, over a limited region of the image, the pattern may be expressed as a sinusoidal wave function, plus some offset value. The wave frequency and amplitude, as well as the offset value, are constant over a limited region of the image, though they are likely to vary from one region of the image to another. It is not expected that the image brightness will actually follow a sinusoidal function; the point is that representation of the pattern by such a function captures the essential feature of the pattern, viz, the positions of lines of maximum and minimum intensity. In a standard fingerprint, marking is done with dark ink on a lighter background; the lines of intensity minimum therefore correspond to the axes of the ridges, while the maxima correspond to the axes of the valleys between the ridges.

Several researchers have developed representations of the fingerprint as a wave pattern. This task is complicated by two factors: the presence in the flow pattern of core and delta points, at which the ridge orientation is undefined; and the existence of the minutiae, which are the points at which ridges bifurcate or terminate. There are ways to handle such features in a wave phase representation. Therefore, in an embodiment, rather than representing the print as a wave pattern, the processing method generates a normalized representation in which the points on the ridge axes have the value −1, the points on the inter-ridge axes have the value +1, and intermediate points have intermediate values. The result is a clear uniform image of the ridges.

Real fingerprint images are subject to a number of corrupting influences that cause the image to differ from a simple periodic ridge pattern. These include: image noise introduced by the image capture process itself, variations in thickness of the ink or other marking medium causing the darkness of the ridges to be non-uniform, variation in the brightness of the background, and irregularity in the ridges themselves including wiggles and transient features such as spurs and breaks. Strictly speaking, these are not noise, inasmuch as they reflect what is actually present on the fingertip. However, they are extraneous to the ridge pattern so it is desirable to eliminate these irregularities during image processing.

In the embodiment of FIG. 12, the processing comprises reducing or eliminating these various kinds of noise, then normalizing the result so that the image values range from −1 (ridge axes) to +1 (valley axes).

An important secondary function of the processing is segmentation of the print. This refers to separation of the image into foreground (print) and background, each point in the image being assigned to one or the other. The foreground is defined as the part of the image in which the ridge pattern can be retrieved. A point may be labeled as background for one of two reasons; it may be outside the area contacted by the fingertip, or it may be within the area, but the ridge pattern may be too unclear to delineate it with confidence. Foreground and background points are labeled with the values 1 and 0 respectively.

As shown in FIG. 12, the process of converting an image into a high-contrast representation of ridge flow begins with step 1202, where the image is read into memory from the user-specified file. If it is not a grayscale image, it is preferably converted to a grayscale data format.

In step 1204, a bandpass filter is applied. This is a filter that eliminates all frequency components of the image, except those lying within a specified range. This exploits the fact that ridges on human fingers tend to have a spacing that does not vary a great deal from 0.5 mm; the frequency range cutoff values allow for a variation either side of this value by a fairly generous factor of two. (Clearly, therefore, it is necessary to know the image resolution, in order to convert this average ridge wavelength into a width expressed as a number of pixels.) One effect of the bandpass filter is to eliminate the zero-frequency component, or "DC component"; this makes the mean intensity value equal to zero over any extended area of the image, which is part of the requirement for a normalized representation.

In step 1206, the orientation pattern of the ridges is analyzed. This step retrieves a number of quantities, including the orientation of the ridge pattern at each point. Another quantity determined in the example embodiment is coherence. Coherence is represented by a number between 0 and 1, and is a measure of how well defined the orientation pattern is at each point. A value of 1 corresponds to the optimum situation, where all the intensity variation in the image is in one direction (perpendicular to the ridges), with no variation in the direction parallel to the ridges, A value of 0 indicates no preference for one direction over another, as would occur in a region of uniform brightness or with random image noise that was not directionally dependent.

The ridge orientation field, along with other relevant parameters such as coherence, is obtained by a method that will be referred to as Principal Component Analysis. This process identifies the direction at each point in the image in which the intensity variation per unit is greatest; in a ridge pattern this is typically perpendicular to the ridges. Because the intensity gradient along any direction, which is the measure of the variation, may be positive or negative, the square of the intensity gradient is used. In particular, at each point the direction is identified for which the squared intensity gradient, taken along this direction and averaged over the neighborhood of the point, is a maximum. Best results are obtained if the radius of the neighborhood is about equal to the average ridge wavelength; using a smaller neighborhood results in oversensitivity to image noise, while too large a radius "smoothes out" the orientation field too much, and may result in inaccurate placement of the cores and deltas.

The direction Θ of maximal squared intensity gradient is given by:

$$2\Theta = \arctan(P/D)$$

where $$D = \mathrm{mean}(g_x^2 - g_y^2)$$

$$P = \mathrm{mean}(2 g_x g_y)$$

and $g_x$ and $g_y$ are the image intensity gradients in the x and y directions respectively.

There are two values of Θ (180 degrees apart) that satisfy this equation. This reflects the fact that orientation is an ambiguous quantity; a road on a map is designated as running east to west, but traffic on that road may be traveling either east or west.

Two other quantities are extracted at this stage. These are:

$$R = \sqrt{(D^2 + P^2)}$$

$$E = \mathrm{mean}(g_x^2 + g_y^2)$$

Both these quantities are always non-negative. The energy E is a measure of the total image variation without reference to direction, while ft, the directional response, measures the total directionally dependent image variation. R is zero when the pattern is completely isotropic, i.e. when the average amount of variation is the same no matter which direction one moves within the image; it is equal to E when all the variation is along one direction, as for example in the case of a set of perfectly parallel lines. The quantity C=R/E therefore always lies between 0 and 1, and may be used as a measure of the pattern's coherence, or how well the orientation of the pattern is defined. Very low coherence values occur in areas where the fingerprint is smudged or otherwise corrupted, as well as in most parts of the background; C is therefore one quantity that is useful in separating the print foreground from the background.

The quantities obtained in this analysis stage are used in the later noise removal stages, and they also provide important cues when performing segmentation.

Next, in step 1208, segmentation is performed by applying a series of segmentation masks. A segmentation mask is an image consisting of a set of binary values for all points in the image. Points assigned a value of 1 are denoted "foreground"; points assigned a value of zero are denoted "background".

In an embodiment, three different segmentation masks are generated, based on three different quantities. A coherence segmentation is generated by assigning a value of 1 to all points where the quantity C, defined above, is greater than a threshold value. The threshold may be selected by experimentation to correspond to characteristics of the image. A value of 0.3 is typical of a coherence value at which the ridge orientation is readily discernible.

In a preferred embodiment, this mask is modified to fill in holes occurring at a singularity in the flow pattern (a core or delta point). At these points, the coherence drops to a very low value. This is not because the ridges are poorly defined at this point, but because the orientation varies rapidly over a small region of space. This leaves "holes" in the mask at these points, the size of the hole being roughly equal to the radius of the neighborhood used in taking the means of gradient quantities to calculate D and P above. This operation is referred to as morphological closure.

The coherence segmentation is normally effective in including all the fingerprint regions where the pattern can be interpreted with the human eye, and it masks out most of the background. However there are certain types of background features that show high directional coherence, such as handwritten annotations, ruled lines on the card or the grain of the surface on which the print was made. Thus, in a preferred embodiment, the coherence mask is supplemented by additional masks.

In the example embodiment, a second mask based on directional response is generated based on the quantity R defined above. This quantity is a magnitude rather than a dimensionless quantity such as coherence; it measures the amount (in intensity per pixel displacement) by which the intensity varies in a directionally dependent manner. This mask eliminates background regions where the pattern is faint but highly linear. Many materials such as paper or wood exhibit a grain structure that is normally much fainter than the fingerprint ridges and may even not be discernible to the eye in the original image. This grain structure will result in high values for coherence, so that a coherence mask alone will erroneously include these areas as part of the foreground.

The directional response mask is generated by identifying all points where the quantity R is above a certain threshold. The threshold is selected based on the properties of the image, as follows.

The assumption is made that the fingerprint will occupy at least 5% of the image. Therefore, the quantity $R_m$ is found, such that only 5% of the points in the image have a value $R > R_m$. If the foregoing assumption is valid, then this means that $R_m$ will be a value representative of points within the print foreground. Some foreground points will have a greater value of R; most will show a smaller value.

The threshold value $R_T$ is then set to $0.01 * R_m$. This allows the mask to include regions where R is significantly less than the 95-percentile value. However it successfully masks out regions described above, namely parts of the background where there is a linear pattern corresponding to a very faint grain.

In this example embodiment, a third mask is generated based on the ridge frequency extracted from the pattern. First, a binary version of the enhanced image is generated by replacing all positive image values by 1 (white) and all negative values by 0 (black). Since the enhanced image is normalized, the values are symmetrical about zero, so the resulting binary image contains roughly the same number of on and off bits. Then, the borders of the black and white regions are identified. These are pixels whose binary value differs from the binary value of one or more of its neighbors. Next, since the direction of the ridge normal is already known, the number of on/off transitions per unit distance normal to the ridges is examined for each part of the image. The ridge frequency is half this value.

The mask is defined by selecting points for which the measured ridge frequency and the theoretical average frequency differ by less than a relative factor of 0.4. That is, if $f_m$ is the mean frequency, f will lie between $f_m/1.4$ and $1.4*f_m$.

The frequency mask shows holes similar to those in the coherence segmentation mask, and for the same reason; the core and delta points are points at which the orientation is ill-defined, therefore the frequency, measured along a particular direction, is also not well-defined. These holes are filled in using the same procedure as in the coherence mask.

The frequency-based segmentation filters out parts of the back-ground containing features such as ruled lines or handwritten notes. Such patterns are highly linear, but they are typically isolated lines rather than a series of parallel lines such as is found in the ridge pattern.

The three segmentation masks described above are preferably combined into one final segmentation mask by an intersection operation. That is, a point is marked as foreground in the final mask if and only if it is a foreground point in all three individual masks.

In step 1210, the orientation field is smoothed. This reduces, and may eliminate, the effect of isolated linear features that are not associated with the ridges, such as skin folds, or handwritten lines drawn across the pattern.

An accurate prior determination of the orientation field is preferred, since knowing the orientation at each point allows the process to avoid smoothing out the pattern in the cross-ridge direction, which may eliminate ridge features of interest. For this reason, in an embodiment the process seeks to remove as much noise as possible from the derived orientation pattern before proceeding to the second stage.

The orientation, which is an angular measurement, can be smoothed by a of averaging angles, for example: Express the angle as a vector quantity, e.g. a vector V with components $Vx = \cos(\Theta)$ and $Vy = \sin(\Theta)$. Vx and Vy are smoothed by taking a weighted mean over the image or a neighborhood within the image. The quantity is converted back to an angle by taking the angle defined by the smoothed components mean (Vx) and mean (Vy).

The example embodiment deals with two complications arising in the case of ridge orientation patterns. The first is that orientation is an ambiguous quantity, as noted above. An orientation of 30° is indistinguishable from an orientation of 150°. The example embodiment compensates for this factor by doubling the angle, then smoothing the doubled angle (which we denote Φ) by means of a weighted averaging, and finally halving the result.

The second complication is the core and delta points in the fingerprint. These represent singularities in the orientation field, and it is not practical or desirable to directly apply smoothing at these points. A simple smoothing generally has the effect of shifting the core or delta point to the wrong place.

A core point is characterized by the fact that, if a closed path is traced around the point and follow the behaviour of the orientation, this vector rotates by 180 degrees for a single clockwise traversal of the closed path. The doubled angle therefore rotates by 360 degrees. The same behavior happens at a delta point, except that the rotation is in the opposite sense. In other words, the cores and deltas can be treated as generating spirals in the orientation field, the spiral flows being superimposed on an otherwise continuous flow pattern. The doubled angle Φ over the image can be expressed as:

$$\Phi = \Phi_C + \Phi_S$$

where $\Phi_C$ is the residual field, and is $\Phi_S$ the spiral orientation field resulting from the presence of the cores and deltas.

At any point (x,y) in the image, the spiral field from a core point P is the bearing angle from the point (x,y) to the point P. This has the desired property that when any closed path is traced around P, the angle does one complete rotation.

Similarly the spiral field around a delta point is taken as the negative of the bearing angle. This gives the required rotation of the vector, in the opposite direction to the direction of the path traversal.

Core and delta points in the original Φ field are located in the example embodiment using a quantity called the Poincaré index. This is obtained using the spatial derivatives of the angle (in mathematical language, it is the curl of the x and y spatial derivatives of the angle), and its value is $2\pi$ at a core point, $-2\pi$ at a delta, and zero everywhere else.

In summary, in an example embodiment the orientation quantity is smoothed using the following steps:
1. Calculate the doubled angle Φ;
2. Locate the core points using the Poincaré index;
3. Calculate the spiral field across the image for each core and delta point, and sum these to give $\Phi_S$;
4. Subtract $\Phi_S$ from Φ to give $\Phi_C$;
5. Smooth $\Phi_C$ using a weighted neighborhood average;
6. Add $\Phi_S$ back to the result to give a final smoothed field Φ with the core and delta points preserved.

In step 1212, ridge enhancement is performed. The ridge enhancement process is an image smoothing operation that smoothes intensity variations in the direction parallel to the ridges, while those in the perpendicular direction are largely unaffected. The example embodiment seeks to avoid smoothing in the cross-ridge direction, since this would eventually destroy the pattern of ridges and valleys, which are features of interest to be enhanced rather than diminished.

Ridge enhancement is a process for reducing or eliminating irregularities in the ridge pattern, making it conform more closely to a theoretically ideal ridge pattern. Ideally the pattern resembles a wave pattern with no breaks in the waves, with the crests and trough having the same amplitude everywhere. In this idealized ridge pattern the intensity is constant when one traces a path in the image parallel to the ridges.

In the example embodiment, noise consisting of small intensity fluctuations in an image is reduced or eliminated by applying a suitably chosen smoothing filter, which replaces the intensity value at a pixel by a value calculated as a weighted average of pixels in a restricted neighborhood. A modified process is desirable to ensure that any smoothing takes place only in the direction parallel to the ridges, otherwise spatial averaging may reduce or eliminate the ridges themselves.

In an embodiment, a method described as oriented diffusion is employed. This exploits the fact that, if an intensity profile is taken along the direction of the ridge orientation, the humps and dips in the profile are related to the second spatial derivative of the intensity taken along that direction. This can be seen by considering the intensity I as a function f of spatial location x, and expressing f as a Taylor expansion centered on a reference value $x_0$:

$$f(x_0+d)=f(x_0)+f'(x_0)d+[f''(x_0)]d^2/2+$$

where $f'(x_0)$, $f''(x_0)$ etc are the $1^{st}$, 2nd etc. derivatives of f at the point $x_0$.

If we now take a small interval centered on $x_0$, for example allow d to range from −r to +r for some r, and examine the mean of the above expression over the interval, we see that the term in f vanishes because the mean value of d is zero. An approximation to the mean value can therefore be made by taking $$mean(f) \approx f(x_0)+[f''(x_0)]*mean(d^2)/2$$

The term "mean ($d^2$)" is constant, and simply depends on the size of our chosen interval. The equality is only approximate, because the full Taylor expansion contains higher order terms.

In the example embodiment, oriented diffusion is performed as follows: (1) Obtain the second spatial derivative f" of intensity, taken at each pixel in the direction of the ridge orientation; (2) Average this quantity over a very small neighborhood of the pixel (the size of the neighborhood used is somewhat less than the average ridge wavelength); (3) Apply the above formula to estimate the mean intensity; and (4) Repeat the above steps as often as desired.

Experimentation has shown that improvement in the ridge definition is rapid for the first few iterations of the diffusion process, but eventually a plateau is reached at which further application of the process results in little noticeable improvement. This happens after somewhere between 50 and 100 iterations, depending on the quality of the initial image. The number of iterations may be set by experimentation based on typical input image quality.

In step 1214, a quadrature operation is applied to the image, allowing the intensity at each point to be expressed in terms of the amplitude and phase of a sine wave. The quadrature operation follows the processes disclosed by Larkin and Fletcher for obtaining the quadrature of a two-dimensional image function. The original function, together with its quadrature, may be combined to produce a complex valued function representing a periodic wave, and the phase at any point can be obtained by examining the relative values of the real and imaginary parts of the complex function.

Obtaining the quadrature requires specifying the direction of the wave normal at each point. This is at right angles to the ridges, but as noted above, it is only possible to specify the ridge orientation as being in one of two directions, 180 degrees apart. This ambiguity in the wave direction results in a corresponding ambiguity in the phase. However, the quantity of primary interest in the height of the wave at each point, measured by the cosine of the phase. The same cosine value is found irrespective of which of the two possible directions was taken as the wave normal.

The end result, then, is a map showing the cosine of the phase. In such a representation the wave crests all have the same intensity value (+1) and the troughs all have the same value (−1). Prints are normally taken using a dark marking medium on a lighter background; therefore the wave crests correspond to the inter-ridge valley axes and the troughs correspond to the ridge axes. The amplitude is discarded; the cosine of the phase is the normalized image, since the cosine values lie between −1 and +1.

Finally, in step 1216, if applicable, the resultant smoothed and normalized image and the foreground mask image are each written to user-specified storage locations.

Figure 13:
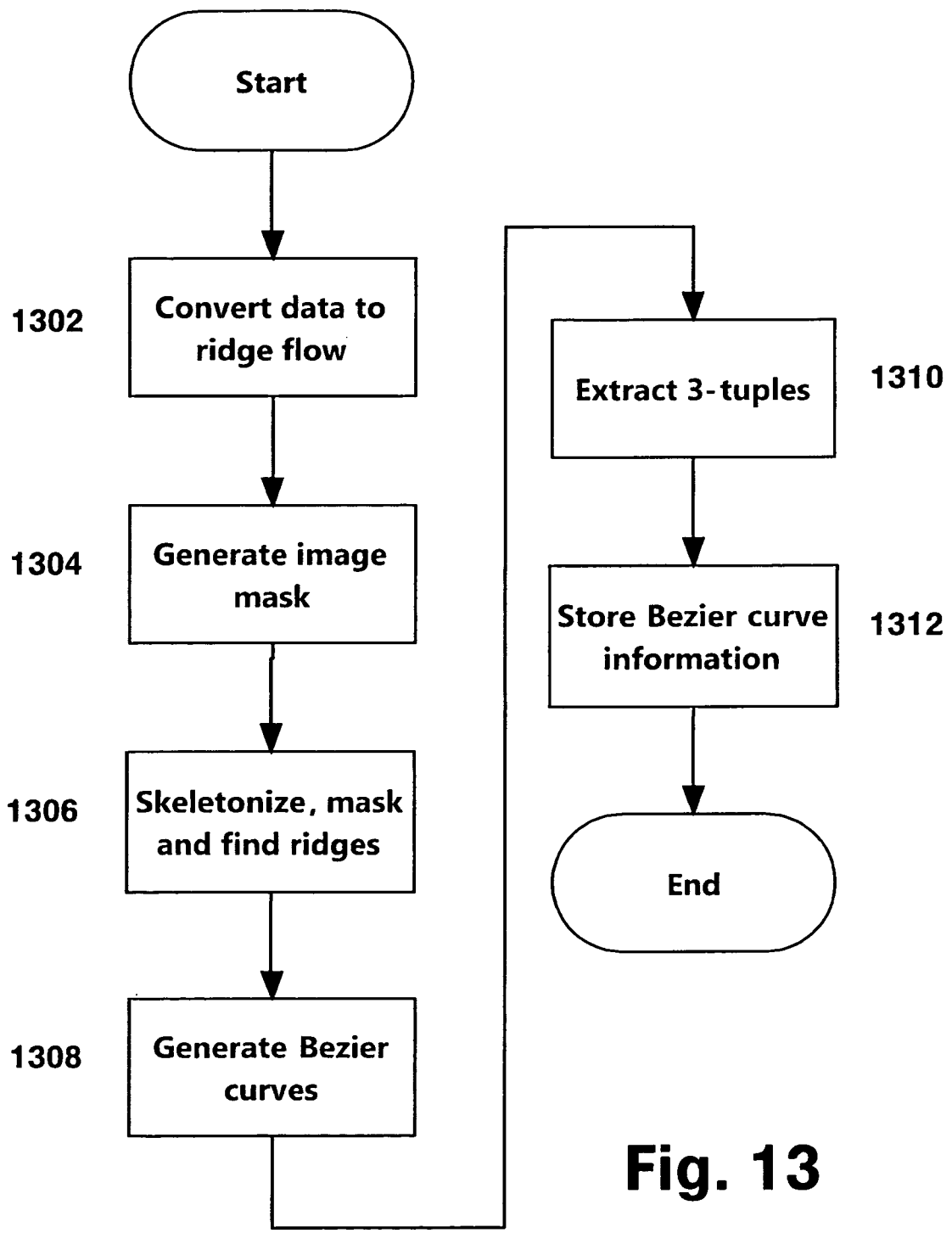
FIG. 13 is an example of a fingerprint specimen.

To illustrate the results of the example process of FIG. 12, FIG. 13 is an example of a fingerprint specimen and FIG. 14 is an example of a high-contrast representation of the fingerprint of FIG. 13. In this particular high contrast representation, ridges are shown in black and furrows as white.

Referring again to FIG. 11a, now that the conversion of the image into a high-contrast representation of ridge flow in step 1102 is complete, processing continues with step 1104 where the image is skeletonized to identify the center lines of ridges or furrows.

Skeletonizing the high contrast image creates a version of the image in which the ridges are represented as pathways one pixel in width and equidistant to the original contours of the ridge. The skeleton image preserves the geometrical and topological properties of the ridges, such as connectivity, topology, length, direction, and width. Together with the distance from the skeleton points to corresponding ridge contour points, the skeleton contains all the information necessary to reconstruct the shapes of the ridges as shown in the high contrast image.

As a prelude to skeleton creation, the high contrast image is preferably thresholded to black and white. Because it is already in high contrast form, a single threshold value can be used and all pixel values above the threshold convert to white and all pixel values below (or equal to) the threshold convert to black. There are multiple methods for creating skeletons from bi-tonal images. All methods that create a skeleton that is a reliable centerline for the ridges in the high contrast image are suitable. FIG. 15*b* shows a skeleton portion taken from within the fingerprint image shown in FIG. 15*a*.

In step 1106, Bezier curves are generated along the identified ridges. This step entails creating a representation for each ridge in the form of a series of Bezier curves. These curves are a compact computable way to represent the curvature of the ridges.

The first step in Bezier curve generation is to segment the ridges into sections. This is accomplished by establishing rules for segmentation. In an example embodiment, each curve should have a length of 260 units and curves should be generated every interval of 60 units, where a "unit" represents 1/1000 of an inch which is a common resolution for fingerprint images. FIG. 16 shows an example of curve selection from a single ridge with staggered starting points and overlap for each identified curve. In this figure, the furrows are shown in light gray and the ridges are white. The wide black segment superimposed on the ridges represents a Bezier curve segment. FIG. 16 illustrates three such segments representing the "staggering" of starting point selection. In this example embodiment the starting points are spaced by 60 units. If a single ridge is not as long as the starting point spacing (60 units in the example embodiment), the entire length of the ridge is used as a single segment.

Fingerprint ridges can be described by Bezier curves with four control points. For a set of four control points, the order of the Bezier curve is three. The first two control points are the endpoints of the edge. The remaining two control points help establish the edge points of the curve. Creating these points first assumes that each point corresponds to a time step, t=1/m where m is the number of edge points.

The next step is to create a set of (order−1) basis vectors using the formula for the Bernstein polynomials. The Bernstein polynomials are given by $$B_{i,n}(t) = \binom{n}{i} t^i (1-t)^{n-i}$$

where $$\binom{n}{k}$$

is a binomial coefficient. The Bernstein polynomials of degree n form a basis for the power polynomials of degree n. For the algorithm herein described, n=order−1 and i=1, ... m. Note that each basis vector has m values. Next, regression vectors are constructed using the (x, y) values given by the edge points. Scale all (x, y) values so that x has the endpoints at interval [0, 1] and y has the endpoints at interval [0, 1], where $x_{Shift}$=x-value at the first edge point.
$x_{Scale}$=x-value at last edge point x-value at first edge point.
$y_{Shift}$=y-value at the first edge point.
$y_{Scale}$=y-value at last edge pointy-value at first edge point.

At each edge point, compute t=j/m, j=0, ... , m−1. Transform all the x-values by:

$$x_{New}[j]=x_{Val}[j]-x_{Scale}t^{n+1}-x_{shift}$$

Similarly transform all they-values:

$$y_{New}[j]=y_{Val}[j]-y_{Scale}t^{n+1}-y_{Shift}$$

Once the basis and regression vectors all of length m have been created, a Graham-Schmidt orthogonalization routine is used to determine the values of the two missing control points. These values are the best control points possible computed to minimize the error between the Bezier the specified order and the supplied edge points. In an embodiments, the projection operator is defined by $$proj_u(v) = \frac{\langle v, u \rangle}{\langle u, u \rangle} u$$

where <v,u> denotes the inner product of the vectors v and u. This operator projects the vector v orthogonally onto the line spanned by vector u. The Gram-Schmidt process then works as follows:

$$u_1 = v_1, \quad e_1 = \frac{u_1}{\|u_1\|}$$

$$u_2 = v_2 - proj_{u_1}(v_2), \quad e_2 = \frac{u_2}{\|u_2\|}$$

$$\vdots$$

$$u_k = v_k - \sum_{j=1}^{k-1} proj_{u_j}(v_k), \quad e_k = \frac{u_k}{\|u_k\|}$$

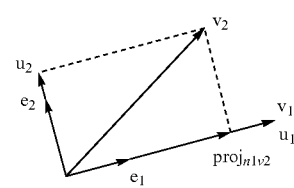

The first two steps of the Gram-Schmidt process are described as follows: The sequence $u_1, \ldots, u_k$ is a system of orthogonal vectors, and the normalized vectors $e_1, \ldots, e_k$ form an orthonormal set. The calculation of the sequence $u_1, \ldots, u_k$ is known as Gram-Schmidt orthogonalization, while the calculation of the sequence $e_1, \ldots, e_k$ is known as Gram-Schmidt orthonormalization as the vectors are normalized.

To check that these formulas yield an orthogonal sequence, first compute $\langle u_1, u_2 \rangle$ by substituting the above formula for $u_2$, the result is zero. Then use this to compute $\langle u_1, u_3 \rangle$ again by substituting the formula for $u_3$ with result equal to zero.

Geometrically, this method proceeds as follows: to compute $u_i$, it projects $v_i$ orthogonally onto the subspace U generated by $u_1, \ldots, u_{i-1}$, which is the same as the subspace generated by $v_1, \ldots, v_{i-1}$. The vector $u_i$ is then defined to be the difference between $v_i$ and this projection, guaranteed to be orthogonal to all of the vectors in the subspace U. The process is setup as a matric with the following structure:

$$\begin{pmatrix} \text{Basis vectors} & \text{Regression vectors} \\ \text{Identity} & 0 \end{pmatrix}$$

Applying the Graham-Schmidt process to the column vectors of the matrix, provides:

$$\begin{pmatrix} \text{Orthogonal basis} & \text{Modified regression vectors} \\ \text{Junk} & \text{Coefficients} \end{pmatrix}$$

The form of the coefficients in the lower right corner of the matrix is preferably modified during the process. There are two regression vectors each corresponding to the x and y values of the data. Each column pair, where the 0 matrix was originally, contains the (x, y) coefficient information, but shifted and negative. Each (x', y') pairing is transformed using the xShift and yShift values from above. Each control point (x, y) is computed by:

$$x = -1.0x + x\text{Shift}$$

$$y = -1.0y + y\text{Shift}$$

Since this process is being used to create 4 control points, there are 2 coefficient pairings and the identity matrix in the formulation is a 2×2. The coefficients are preferably read in order.

In step 1108, Bezier Curves are generated at different intervals and lengths. In this step, using a process similar to that described in step 1106, Bezier curves for each reference print are generated and stored at multiple lengths, L, and intervals, I. In an example embodiment, Bezier Curves are generated at lengths and coarse intervals pairs, {L=260, I=60}, {L=210, I=48}, and {L=80, I=18}, and lengths and fine interval pairs, {L=260, I=5}, {L=210, I=5}, and {L=80, I=5}. If a reference Bezier curve $B_R$, with 4 ordered control points {$B_R[1], B_R[2], B_R[3], B_R[4]$} is generated, then the reference Bezier curve, $B_R'$, is also generated with control points {$B_R[4], B_R[3], B_R[2], B_R[1]$}. This means for any reference Bezier, there exists another reference Bezier with a reverse ordering of its control points.

For a latent fingerprint, Bezier curves are sampled for each ridge initially with the largest length and coarse interval pair, for example, {L=260, I=60}). If the number of Bezier curves generated for a single ridge is less than a given threshold (for example, 10) then the ridge is sampled again at a smaller length and coarse interval pair (for example, {L=210, I=48}). Again, if the threshold is not met, the ridge is sampled again at the smallest length and coarse interval pair (in this case, {L=80, I=18}). The result is a distribution of Bezier curves across the latent print where longer ridges are represented mostly by longer Bezier curves and shorter ridges are sampled with a variety of Bezier curves of shorter lengths and intervals.

Figure 17:
FIG. 17 is a diagram showing a sample distribution of a full roll fingerprint sampled for Bezier curves as a latent fingerprint.

FIG. 17 shows a sample distribution of a full roll fingerprint that has been sampled for Bezier curves as a latent fingerprint. In FIG. 17, dark gray represents Bezier curves of {L=260, I=60} sampled from the fingerprint's ridges, light gray represents {L=210, I=48} sampling and white represents {L=80, I=18} sampling. Unlike the case of processing of full fingerprints, for Bezier curves generated from latent images, there is not necessarily another Bezier curve with a reverse ordering of its control points.

Figure 18:
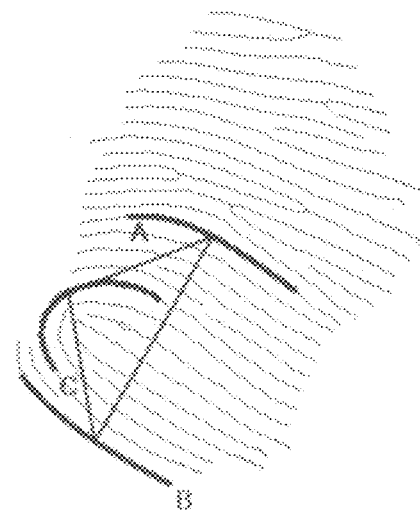
FIG. 18 is a sample distribution of a full roll fingerprint that has been sampled for Bezier curves as a latent fingerprint.

Referring again to FIG. 11a, in step 1110 Bezier 3-tuple sets are extracted from the generated Bezier curves. In particular, triangular sets of Bezier curves are extracted and used as the basis for comparison among fingerprints. These sets of Bezier 3-tuples are extracted pseudo randomly from the entire set of Bezier curves in the latent (as extracted in Step 1108) such that each Bezier curve exists in N (a specifiable number, in this case 5) distinct 3-tuples, if possible. N is a number determined by experimentation to produce the best results for a given type of image. In the example embodiment, N=5. In the example embodiment, for each 3-tuple, the centroids of each Bezier curve are selected to be a specified distance from each other, for example 100 pixels. FIG. 18 is an example image of a 3-Tuple set in a latent fingerprint.

Referring again to FIG. 11a, in step 1112, for each 3-tuple, the best matching corresponding 3-tuple of Bezier curves in the reference print is found. This is accomplished in the following manner.

Figure 19:
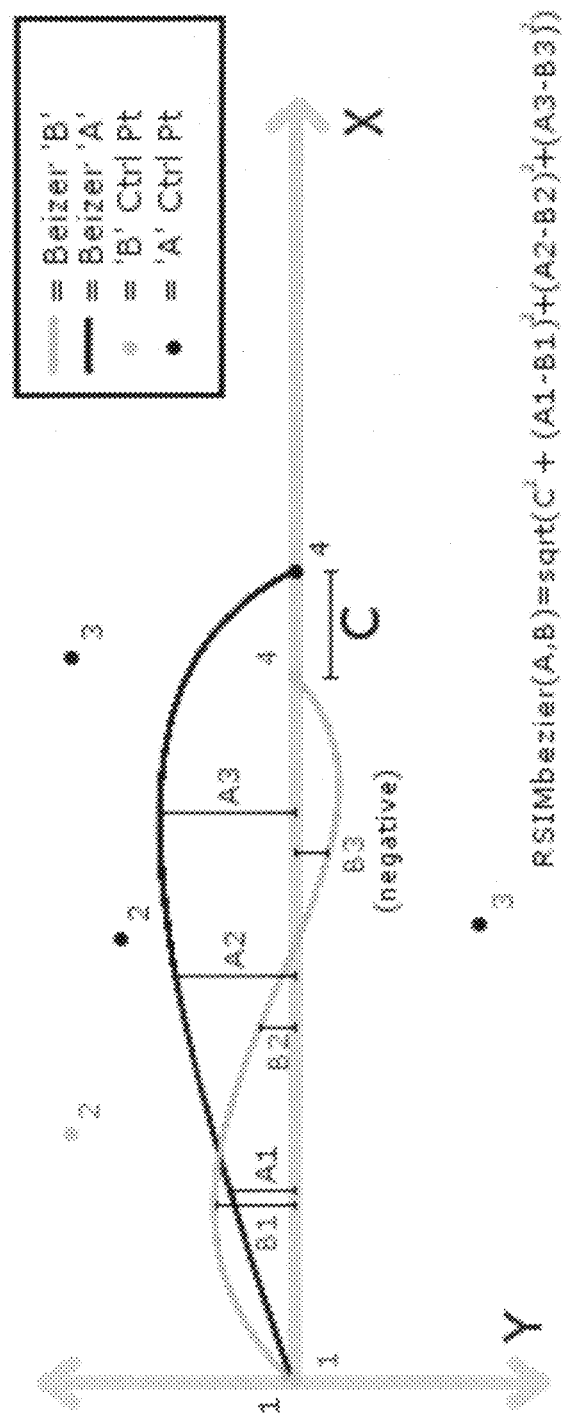
FIG. 19 is a graph showing the calculation of relative similarity between two Beziers.

$\text{RSim}_{Bezier}(A,B)$, the relative similarity between two Beziers, is defined in the following manner (illustrated in FIG. 19). The best relative geometric fitting Beziers are the Bezier curves that scored the lowest by this metric. First, the two Bezier curves are aligned along an x-axis such that each of the Beziers' starting points lie at the origin, and their ending points lie on the x-axis in the positive direction. Then, the similarity $S_{AB} = \text{sqrt}(C^2 + (B1-A1)^2 + (B2-A2)^2 + (B3-A3)^2)$ is calculated, where C is the distance between the $4^{th}$ control points of A and B, and A1, A2, A3 and B1, B2, B3 are altitudes of the A and B sampled at t=0.25, 0.5, and 0.75 when A and B are defined parametrically.

Figure 20:
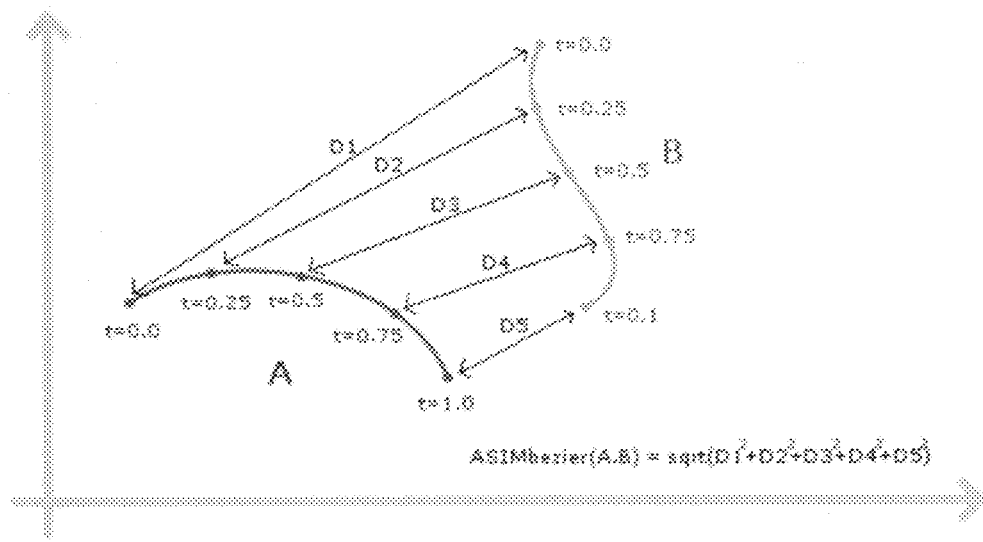
FIG. 20 is a graph illustrating sampling to determine absolute similarity between two Bezier curves.

$\text{ASim}_{Bezier}(A,B)$, the absolute similarity between two Bezier curves, is the square root of the sum of the distances between points sampled along each of the two Bezier curves (in the example embodiment, as illustrated in FIG. 20, each curve is sampled 5 times at t=0.0, 0.25, 0.5, 0.75 and 1.0 when the Bezier is defined parametrically by t). The best absolute geometric fitting Bezier is the Bezier curve that scored the lowest by this metric.

$\text{RSim}_{Tuple}(T,T')$, the relative similarity between two 3-tuple Bezier curve sets, T(A,B,C) T(A',B',C') is defined as $\text{sqrt}(\text{RSim}_{Bezier}(A,A')^2 + \text{RSim}_{Bezier}(B,B')_2 + \text{RSim}_{Bezier}(C,C')^2 + \text{PosSim}(AB,A'B')^2 + \text{PosSim}(BC,B'C')^2 + \text{PosSim}(CA,C'A')^2$, where PosSim(AB,A'B') is the positional similarity between the Bezier pairs AB and A'B', and is defined as follows (illustrated in FIG. 21). The best relative geometric fitting 3-tuple is the 3-tuple that has the lowest score under this metric.

The point array for the Bezier pair AB is $P_{AB} = \{A[1], A[4], B[1], B[4]\}$, where A[n] and B[n] are the nth Bezier control points for A and B respectively.

Figure 21:
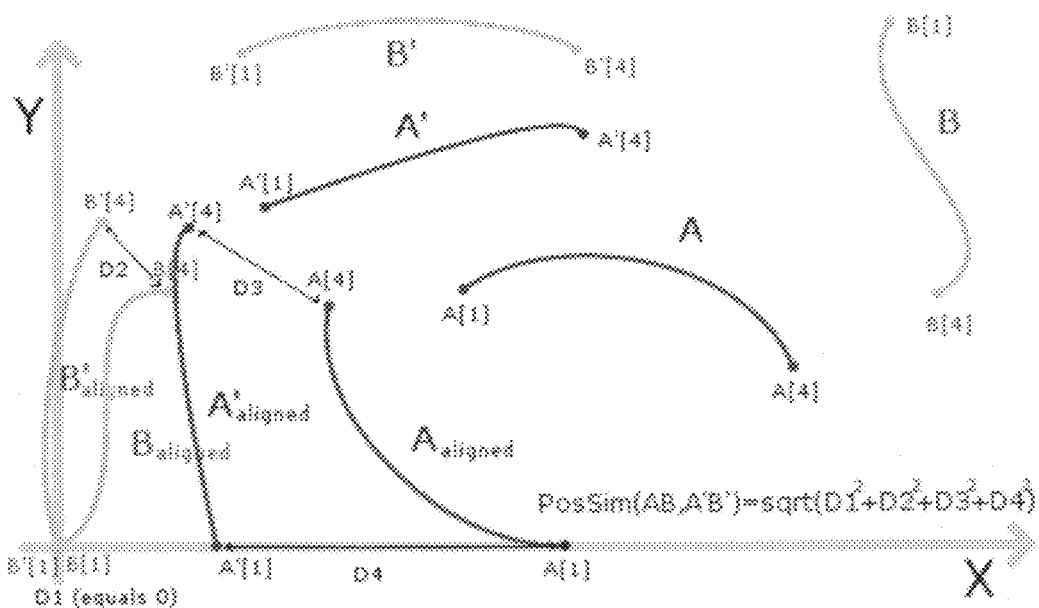
FIG. 21 is a graph illustrating determination of relative similarity between two Bezier curve sets.

$\text{PAligned}_{AB} = f_{align}(P_{AB})$ where $f_{align}(x)$ translates and rotates the vector of points x, such that first element x[0] is at the origin and the last element, x[n] is on the positive x-axis (FIG. 21)

$\text{PosSim}(AB,A'B') = \text{sqrt}(\text{sigma}(n,1,4) \ \{(\text{Dist}(\text{PAligned}_{AB}[n], \text{PAligned}_{A'B'}[n])^2)\})$, where Dist is the geometric distance function and sqrt is the square root function (FIG. 21).

Figure 22:
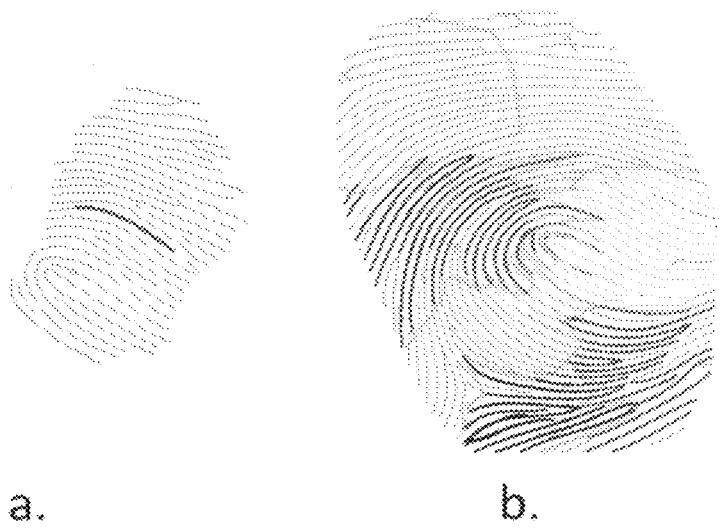
FIG. 22a shows a reference print with a latent Bezier curve and FIG. 22b shows ten Bezier curve clusters associated with the reference print.

For each of the 3-tuple Beziers, ABC, x the Bezier curves in the reference are selected and clustered in the following manner. For a latent Bezier curve, A, generated using a segment length, L, and interval I, the Bezier curves from the Reference generated from the same L and I parameters are selected. These Bezier curves are clustered into N clusters (in the example embodiment, N=10) based on shape and location similarity. FIG. 22 shows a latent Bezier curve and the associated ten Bezier curve clusters for an example reference print.

Figure 23:
FIG. 23 is a depiction of the best-fitting Bezier curves relative to the clusters of FIG. 22b.
Figure 24:
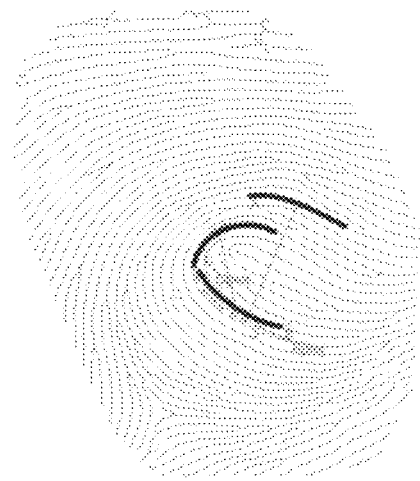
FIG. 24 illustrates a close-matching 3-tuple.

A 3-tuple Bezier match is found in the reference for each Bezier $RefB_{start}$ defined by the combination f: $(LatB_N, C_{N,M}, RefB_O) \rightarrow \{RefB_{start} | LatB_N = ('A','B','C'), 1 <= M, <= 10, 1 <= O <= 5\}$, where $LatB_N$ represents one of the 3 beziers in the Latent 3-tuple (FIG. 21), $C_{N,M}$ is one of M Bezier clusters in the reference based off of $LatB_N$ (FIG. 22), and O enumerates the top 5 best relative geometric fitting Bezier curves in $C_{N,M}$ to $LatB_N$ (FIG. 23). A 3-tuple Bezier match for each $RefB_{start}$ defined by $(LatB_N, C_{N,M}, RefB_O)$ is found as follows: First, the relationship $LatB_N => LatB_{N+1}$ is projected from $RefB_{start}$ to find $RefB_{2projected}$ in the reference. Then, the best absolute matching Bezier in the reference (generated in step 1108) to $RefB_{2projected}$ is found, which is $RefB_2$. The same is done for relationship $LatB_{N+1} => LatB_{N+2}$ to determine $RefB_{3projected}$ and $RefB_3$. FIG. 24 illustrates a close matching 3-tuple based on $RefB_{start}(LatB_N, C_{N,M}, RefB_O)$ (for $LatB_N$='A' in FIG. 18, $C_{N,M}$ is the cluster shown in FIG. 23, and $RefB_O$ is one of the highlighted Bezier curves in FIG. 23). FIG. 25 shows a poor matching 3-tuple based on a $RefB_{start}$ defined by a different $C_{N,M}$.

The similarity between $(LatB_A, LatB_B, LatB_C)$ and every 3-tuple defined by every possible $RefB_{start}$ is determined. Then, of all of the 3-tuples defined by a $RefB_{start}$, the best relative geometric match is taken as the best possible match for the latent 3-tuple.

Referring to FIG. 11a, in step 1114, the overall estimated rotational difference between orientation of the latent print and the reference print, $\Theta_{est}$, is determined. For each latent 3-tuple, $T_L$, and its best matching reference 3-tuple, $T_R$, the angle difference between their orientations is found as follows. Ang(AB), the angle of a Bezier pair AB, is defined as the angle from the mid point of A (t=0.5, when the Bezier is defined parametrically), to the mid point of B. Ang(AB, A'B'), the angle difference between two Bezier pairs, AB, and A'B', is Ang(AB)−Ang(A'B'). $Ang_{3-tuple}(T,T')$, the angle difference between the orientations of two 3-tuples, T consisting of 3 Bezier curves, ABC (T(ABC)), and T'(A'B'C'), is equal to the angle average of Ang(AB,A'B'), Ang(BC, B'C'), and Ang(CA,C'A').

The "angle average" of a set of angle measurements consists of shifting all of the values by some degree, $\Theta$, that minimizes the sum of the absolute values of the differences between all pairs of shifted angles. The "shifted average" is then taken from these values, and this "shifted average" is shifted back $\Theta$ degrees to become the final average of the angles.

The set of these angle differences, S, is taken and the angle $\Theta$, that maximizes that magnitude of the set $R(x) = \{x | x \epsilon S, \Theta-N <= x <= \Theta+N\}$, is found, where N is an angle value. In the example embodiment N=25. The estimated rotational difference between orientation of the latent print and the reference print, $\Theta_{est}$, is the angle average of R(x).

The Bezier 3-tuple sets from the latent are re-extracted as per the instructions in step 1110, but a specifiable maximum distance is also set between the centroids of the Beziers involved in a 3-tuple set when the extraction is being done. In the example embodiment the maximum distance for this calculation is 200 pixels.

In step 1116, the best matching reference 3-tuple, $T_{Reference}$, for each latent 3-tuple (found in step 1112), $T_{Latent}$, is re-identified. The best matching reference 3-tuple in this case is such that $T_{Reference} = \text{argmin}(T', RSim_{Tuple}(T_{Latent}, T') | \Theta-N <= Ang_{3-tuple}(T,T') <= \Theta+N)$, T' $\epsilon$ {all 3-tuples for the reference print}), where N is a specifiable angle. In the example embodiment, N=25). Thus the best reference 3-tuple matches are limited to ones that align with the estimate of $\Theta$.

In step 1118, two vectors of points (of equal magnitude) are selected, one for the latent fingerprint, $V_L$, and one for the reference print, $V_R$, that will serve as control points between "latent fingerprint space" and "reference fingerprint space" in order to create a transformation between the two spaces. This process begins with the empty vectors of points, $V_L$ and $V_R$. For each distinct latent Bezier, $B_{Latent}$, the set of 3-tuples (found in step 1112) that includes $B_{Latent}$ is found. For each of these 3-tuples, the Bezier, $B_{Reference}$, in the best matching reference 3-tuple (found in step 1116) that corresponds to $B_{Latent}$ is identified. $B_{reference}$ is added to the set S of reference Bezier curves that match $B_{Latent}$.

For each $B_{reference}$ in S that occurs more than once, the points $B_{reference}[1]$, $B_{reference}[2]$, $B_{reference}[3]$, and $B_{reference}[4]$ are added to $V_R$, and $B_{Latent}[1]$, $B_{Latent}[2]$, $B_{Latent}[3]$, and $B_{Latent}[4]$ are added to $V_L$. These same points are added again to $V_R$ and $V_L$ for as many times as $B_{Reference}$ occurs in S (in an example embodiment, a minimum of 2 times).

In step 1120, the control point vectors, $V_L$ and $V_R$, are used to create a transformation between latent and reference space. The first control point in $V_L$, $V_L[0]$, is "mapped" to $V_R[0]$, $V_L[1]$ is mapped to $V_R[1]$, and so on. The function f: $P_x, P_y, T_{X1}, T_{Y1}, T_{X2}, T_{Y2}, S_1, S_2, A \rightarrow P_x', P_y'$, is a function that takes a arbitrary point, P, and a set of constants, $T_{X1}, T_{Y1}, T_{X2}, T_{Y2}, S_1, S_2, A$, and returns a transformed point, P'. $f(P_x, P_y, T_{X1}, T_{Y1}, T_{X2}, T_{Y2}, S_1, S_2, A) = \{P_x', P_y' | P_x' = ((P_x' - T_{X2})/S_2 * \cos(A) - (P_y - T_{Y2})/S_2 * \sin(A)) * S_1 + T_{X1}, P_y' = ((P_x - T_{X2})/S_2 * \sin(A) - (P_y - T_{Y2})/S_2 * \cos(A)) * S_1 + T_{Y1}$.

The function g: $V, V' \rightarrow T_{X1}, T_{Y1}, T_{X2}, T_{Y2}, S_1, S_2, A$, is a function that generates the constants for f given two vectors of points, V, V', with equal magnitudes (Note: $V_n.X$ denotes the X coordinate of the nth member of V, and $V_n.Y$ denotes the Y coordinate). $g(V,V') = \{T_{X1}, T_{Y1}, T_{X2}, T_{Y2}, S_1, S_2, A | T_{X1} = \text{sigma}(n,1,N) \{V_n.X/N\}, T_{Y1} = \text{sigma}(n,1,N) \{V_n.Y/N\}, T_{X2} = \text{sigma}(n,1,N) \{V'_n.X/N\}, T_{Y2} = \text{sigma}(n,1,N) \{V'_n.Y/N\}, S_1 = \text{Sqrt}(\text{sigma}(n,1,N) \{((V_n.X - T_{X1})^2 + (V_n.Y - T_{Y1})^2)/N\}), S_2 = \text{Sqrt}(\text{sigma}(n,1,N) \{((V'_n.X - T_{X2})^2 + (V'_n.Y - T_{Y2})^2)/N\}), A = \text{atan}(\text{sigma}(n,1,N) \{V'_n.X * V_n.Y - V'_n.Y * V_n.X\}/\text{sigma}(n,1,N) \{V'_n.X * V_n.X + V'_n.Y * V_n.Y\})\}$.

The latent fingerprint space is split into a triangle-based tessellated grid as depicted in FIG. 26 (the per-cell width being a specifiable number, which in the example embodiment is set at 200 pixels). A transformation f: $P_x, P_y, T_{X1}, T_{Y1}, T_{X2}, T_{Y2}, S_1, S_2, A \rightarrow P_x', P_y'$ is defined for each vertex or distortion-point, Dp, on the grid. The constants are generated by the function g: $V_{Dp}, V'_{Dp} \rightarrow T_{X1}, T_{Y1}, T_{X2}, T_{Y2}, S_1, S_2, A$, where $V_{Dp}$ is a subset of $V_{Reference}$ and $V'_{Dp}$ is a subset of $V_{Latent}$. $V'_{Dp}$ is determined by taking the set of points within $V_{Latent}$ in the ring of square, tessalated grid cells neighboring Dp. If a specifiable minimum number of points in $V_{Latent}$ are not found (in this case, 5), then the points in the next ring of square, tessellated grid cells are included. This pattern continues until the minimum is met. $V_{Dp}$ is then the set of points in $V_{Reference}$ that map to the points in $V'_{Dp}$. Each point Dp can now be transformed into reference space by its function f: $Dp_x, Dp_y, T_{X1}, T_{Y1}, T_{X2}, T_{Y2}, S_1, S_2, A \rightarrow Dp'_x, Dp'_y$, with the constants generated by g: $V_{Dp}, V'_{Dp} \rightarrow T_{X1}, T_{Y1}, T_{X2}, T_{Y2}, S_1, S_2, A$.

Because each of the three vertices of each triangle in the latent's tessellated grid can be transformed into reference space, an affine transformation matrix, M, can be defined for that triangle that will transform any point within that triangle in latent space into reference space. Also, the inverse matrix, $M^{-1}$, will transform any point lying in the transformed triangle in reference space back to latent space.

When all points within the grid have an associated transformed point in reference space (with what will be called the "transformation grid"), the latent print can be "overlaid" onto the reference print as shown in FIG. 27. There is also an "inverse transformation grid" that transforms any point in reference space to latent space (if a reference point lays outside of the transformed grid, the transformation is based off of the inverse matrix, $M^{-1}$, for the closest geometric grid triangle to the reference point.

In step 1122, the transformation grid is refined using two new control point vectors $V_{RefinedL}$ and $V_{RefinedR}$. Each Bezier curve in the latent print, $B_L$, (sampled at length L and interval I) is transformed into reference space via the transformation grid created in step 1120. Each of the physical pixel points of the Bezier curve are transformed into reference space, and a new Bezier, $B'_L$, is calculated using the processes defined in step 1106. The best absolute geometric fitting Bezier in the reference print to $B'_L$ ($B_R$), is found out of the set of reference Bezier curves created from sampling length L, at the "fine" interval (in the example embodiment this interval is 5).

If $ASim_{Bezier}(B'_L, B_R) < \varepsilon_L$, where $\varepsilon_L$ is a specifiable threshold specific to L, then the points $B_R[1]$, $B_R[2]$, $B_R[3]$, and $B_R[4]$ are added to $V_{RefinedR}$, and $B_L[1]$, $B_L[2]$, $B_L[3]$, and $B_L[4]$ are added to $V_{RefinedLatent}$. The transformation grid is recalculated using $V_{RefinedLatent}$ and $V_{RefinedRefrence}$ in the process in step 1120.

In step 1124, a set of latent-to-reference Bezier pairs is created. This is accomplished in the example embodiment by taking the entire set of Latent Beziers, and for Bezier A, finding the best matching reference Bezier A', based on the transformation of the latent to reference space, Atrans. Then, the original latent Bezier, A, is paired with the best matching reference transformed into latent space, A'trans, to provide a set of Latent=>Reference Bezier pairs (A, A'trans).

In step 1126, for each pairing, five points on each curve in the pairing are identified: two endpoints, two quarter points and one center point. FIG. 21 illustrates corresponding curves identified in latent space and reference space.

In FIG. 11a, step 1128, feature vectors are created for each curve in the pairing set, incorporating the ten values related to the points (five 'x' values and five 'y' values). These feature vectors are created using the x and y coordinates from the Bezier curve. FIG. 21 illustrates a sample curve and data vector that it produces.

As shown in step 1130 in FIG. 11a, the Root Mean Square Error value for each pairing of vectors is computed, based on the regression of the reference vector on the latent vector.

Following step 1130, processing continues in step 1132 as shown in FIG. 11b. In step 1132, the RMSE values are captured and stored for each Bezier curve in the latent print and each reference print for which there is a match.

In step 1134, steps 1108 through 1132 are repeated for each reference print being considered, to obtain a corresponding data set for each reference print.

Next, similarities between reference prints and latent prints are determined using a scoring algorithm.

In an example embodiment, scoring is performed by successively building upon sets of individual Bezier-based triangles and then recombining the points from these triangles into new triangles, until a sufficient number of triangle driven matches are made to distinguish the best reference print matching the latent.

In step 1137, the entire set of Bezier polygons from the latent print is grouped into disjoint sets each containing three Bezier polygons.

In step 1139, each latent Bezier 3-polygon set, referred to as a latent Bezier "triangle," is compared with a set of Bezier triangles for the reference print, and the Bezier triangle that best maintains the relative relationships between the Bezier polygons in the latent Bezier triangle is identified. This is done for all of the latent Bezier triangles, resulting in a set of matching reference Bezier triangles.

In step 1141, these matches are filtered to remove the matching reference triangles that have poor measurable similarity to their corresponding latent triangle or are not rotationally consistent with the rest of the matching reference triangles (the set of all reference triangles should be rotated the same amount from their matching latent triangle within some theta if these matches are indeed correct). What is left is a set of Bezier polygons, if any, that are the most confident matches between the latent and the given reference fingerprint.

In step 1143, the points that make up these polygons are used as control points to estimate a transformation from latent to reference coordinate space.

In step 1145, the process of steps 1137 through 1143 is iterated by using these areas of similarity (consisting of confident Bezier matches, if any, between the latent and a reference print) as a new set of control points to generate an improved transformation between latent and reference space. This iterative process is then continued until a local minimum is achieved where the quality of matching between the latent and reference print cannot be significantly improved. An indication of the result is then provided as an output.

Thus, in the example embodiment, fingerprints can be compared using data sets derived from imaged ridge contours and a latent print can be scored for similarity to a reference print as part of an identification or verification process.

The scoring method disclosed herein provides basic scoring functionality. In other embodiments, more complex scoring algorithms may be used. The preferred example embodiment uses scoring methods disclosed in the same inventors' copending Patent Cooperation Treaty Application, Serial No. PCT/US2012/024034, titled "Systems and Methods for Biometric Identification," filed Feb. 6, 2012; the entire disclosure of this PCT application is incorporated herein by reference.

Pre-processing of fingerprint images for comparison and the subsequent comparisons may be performed in a single location, either using a single computing device, or with the software/firmware functions divided among two or more computing devices. Alternatively, reference images and latent images may first be analyzed to obtain a Bezier representation of their ridge structures, either at the same or different locations. The comparison may then be performed at either of these image processing locations, or at a third location. Those skilled in the art will appreciate that dividing the electronic processing steps in any of many possible ways, using different processors, or even different locations, does not remove any part of the overall operation from the range of embodiments contemplated by the inventors. The inventors contemplate that any desired division of processing between processors and sites may be constructed within the scope of the invention. The process may be divided between an unlimited number of locations and processing devices. Thus, after digital processing of the electronic fingerprint image to convert segments of friction ridges appearing in the image to digital representations of curvature of said friction ridge segments, the digital representations will be electronically transferred to a comparison environment, whereby features represented in said digital representations may be compared with the fingerprint reference data. The comparison environment may be the same processor used to create the digital representations, in which case the transfer to the comparison environment may merely constitute the loading of comparison software instructions into the processor. If the comparison environment is a different processor or is at a different location, this transfer may involve conveying electronic information between different computing devices, using storage devices, a local area network, the internet, a private network, or another of the large number of data transfer mechanisms known to those skilled in the art.

Although illustrative embodiments have been described herein in detail, it should be noted and understood that the descriptions and drawings have been provided for purposes of illustration only and that other variations both in form and detail can be added thereupon without departing from the spirit and scope of the invention. The terms and expressions have been used as terms of description and not terms of limitation. Thus, the breadth and scope of the present invention should not be limited by any of the above-described exemplary embodiments, but should be defined only in accordance with the following claims and their equivalents. The terms or expressions herein should not be interpreted to exclude any equivalents of features shown and described or portions thereof.

We claim:

1. A method of electronically comparing electronic fingerprint image data with fingerprint reference data, comprising the steps of:
   digitally processing, at one or more processors, the electronic fingerprint image data to convert segments of friction ridges appearing in the image data to digital Bezier descriptor representations curvature of said friction ridge segments;
   electronically transferring, by the one or more processors, data representing said digital representations of curvature to an electronic comparison environment, whereby features represented in said digital representations are compared with corresponding digital representations of the fingerprint reference data;
   extracting by the one or more processors, triangular sets of curves from the digital Bezier descriptor representations of curvature; and
   determining, by the one or more processors, a match between electronic fingerprint image data and the fingerprint reference data based on the triangular sets of curves.

2. The method of claim 1, wherein variable-length sections of the friction ridges are converted to said digital Bezier descriptor representations.

3. The method of claim 1, wherein the step of digitally processing the fingerprint image data comprises converting the electronic fingerprint image data into skeleton form, the skeleton form identifying center lines of ridges or furrows of the fingerprint image data.

4. The method of claim 1, comprising the further step of storing Bezier descriptors representing ridge curvature in a database of reference fingerprints.

5. The method of claim 1, comprising the further steps of receiving said digital Bezier descriptor representations at the comparison environment, detecting similarities between a plurality of said digital Bezier descriptor representations, quantifying these similarities, and providing an output indicating whether the electronic fingerprint image data is a likely match for the fingerprint reference data.

6. The method of claim 5, where scores are tabulated by pair-wise comparisons among edge segment descriptors.

7. The method of claim 6, wherein feature vectors are constructed from multiple curve segments between fingerprints where graph isomorphism is used to establish selection of corresponding curves.

8. The method in claim 6, where a score from a comparison of an individual fingerprint specimen compared against the fingerprint reference data is combined with scores from other specimens to create a combined fused score for a plurality of fingerprints including the other specimens.

9. A fingerprint matching software product, comprising:
   a non-transitory computer-readable medium;
   a software program encoded on said computer-readable medium, said software program containing instructions that, when executed by a processor of a computing device, cause the computing device to:
   receive, as an input to the computing device, data representing an electronic fingerprint image;
   electronically process said electronic fingerprint image data to convert segments of friction ridges appearing in the electronic fingerprint image data to digital Bezier descriptor representations of curvature of said friction ridge segments; and
   electronically transfer said digital Bezier descriptor representations to a digital comparison environment, wherein said transfer causes groups of said Bezier descriptor representations to be electronically compared within said digital comparison environment with groups of reference Bezier descriptor representations to determine whether the digital fingerprint image data matches a reference image, said groups of said Beer descriptor representations having triangular tuple sets of Bezier descriptor representations.

* * * * *